(12) United States Patent
Suh et al.

(10) Patent No.: US 9,946,446 B2
(45) Date of Patent: Apr. 17, 2018

(54) MOBILE TERMINAL

(71) Applicant: LG ELECTRONICS INC., Seoul (KR)

(72) Inventors: Meeohk Suh, Seoul (KR); Hyejong Yoo, Seoul (KR); Jongsup Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 288 days.

(21) Appl. No.: 14/498,635

(22) Filed: Sep. 26, 2014

(65) Prior Publication Data

US 2015/0094120 A1    Apr. 2, 2015

(30) Foreign Application Priority Data

Sep. 30, 2013    (KR) .................. 10-2013-0116647

(51) Int. Cl.
*G06F 3/0484* (2013.01)
*G06F 3/0488* (2013.01)

(52) U.S. Cl.
CPC ...... *G06F 3/04842* (2013.01); *G06F 3/04883* (2013.01); *G06F 3/04886* (2013.01)

(58) Field of Classification Search
CPC ............. G06F 3/04842; G06F 3/04886; G06F 3/04883
See application file for complete search history.

(56) References Cited

U.S. PATENT DOCUMENTS

| | | | |
|---|---|---|---|
| 2013/0024796 A1* | 1/2013 | Seo ..................... | G06F 3/04883 715/769 |
| 2013/0145448 A1* | 6/2013 | Newell .................. | G06F 21/31 726/7 |
| 2013/0311925 A1* | 11/2013 | Denker .................. | G06F 3/013 715/771 |
| 2014/0029017 A1* | 1/2014 | Lee ........................ | G01B 11/24 356/601 |
| 2015/0007075 A1* | 1/2015 | Choi ..................... | G06F 3/0488 715/769 |

* cited by examiner

*Primary Examiner* — Marcos Torres
(74) *Attorney, Agent, or Firm* — Birch, Stewart, Kolasch & Birch, LLP

(57) ABSTRACT

A mobile terminal including a wireless communication unit configured to provide wireless communication; a touch screen; and a controller configured to receive a touch input on a peripheral region of the touch screen, display at least one display item from among a plurality of display items on the touch screen in response to the received touch input, in which the at least one display item identifies a foreground panel among a plurality of available foreground panels, receive a dragging touch input in which the touch input is dragged and dropped at the at least one display item, and display a foreground panel corresponding to the at least one item by overlapping the foreground panel on at least part of the touch screen.

6 Claims, 30 Drawing Sheets

FIG. 6
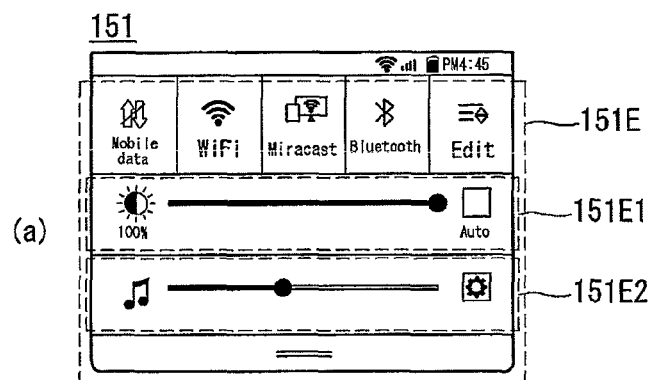
(a) Video play application under execution
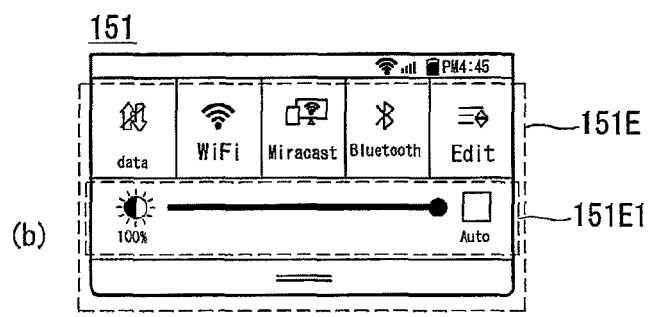
(b) Web browsing application under execution
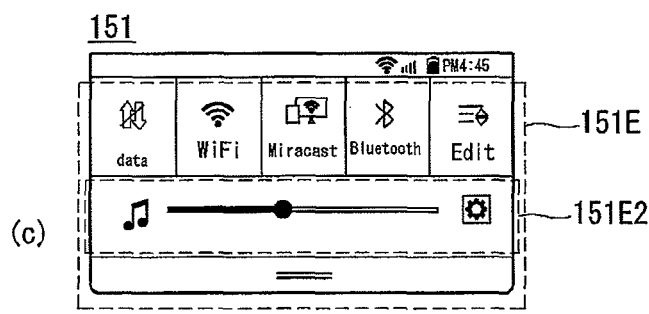
(c) Radio application under execution

FIG. 10
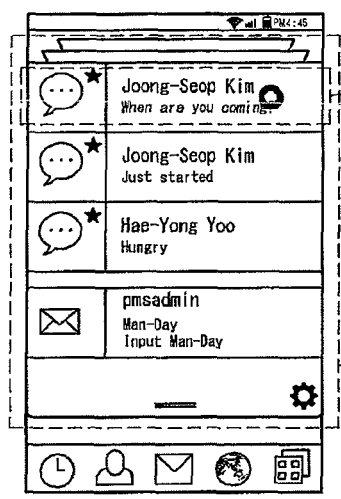
(a) touch
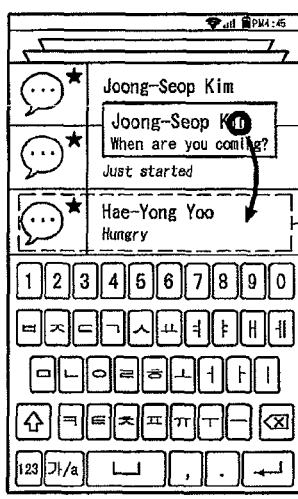
(b) drag
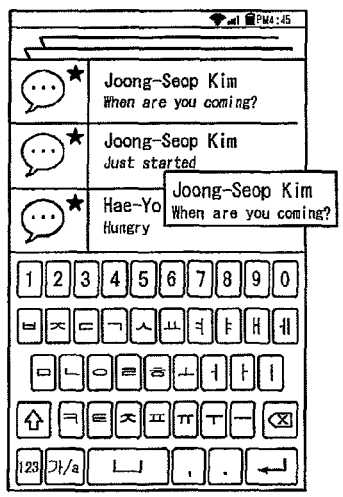
(c)
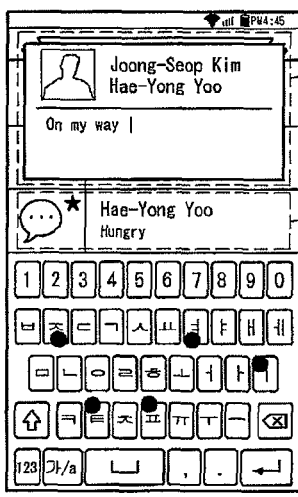
(d)

(a)　　　　　　(b)

FIG. 19
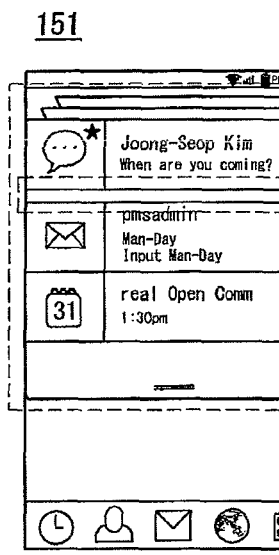
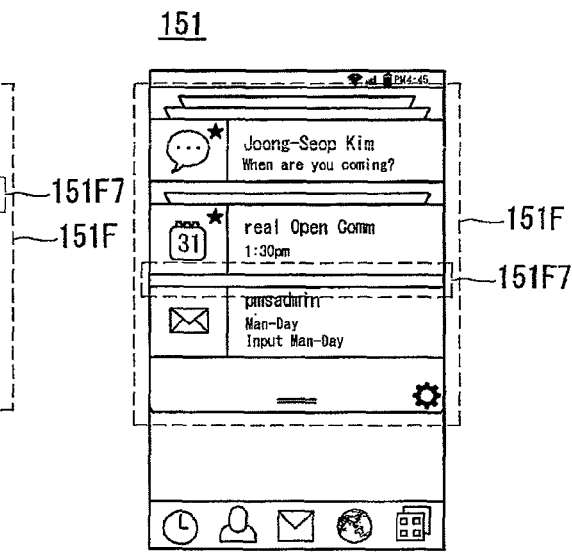
In case the user sets a message
application as a
"favorite" application
(a)
In case the user sets a message
application and a calendar
application as "favorite"
applications
(b)

FIG. 30
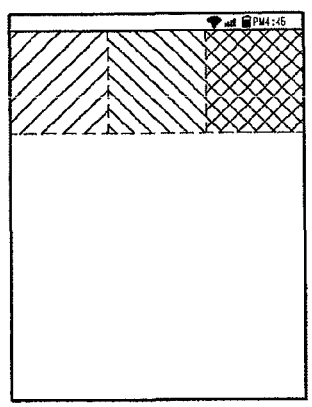
(a) Status1 :Normal
◨ -Foreground Panel 1
◨ -Foreground Panel 2
▩ -Foreground Panel 3
Direction allocated to foreground panel
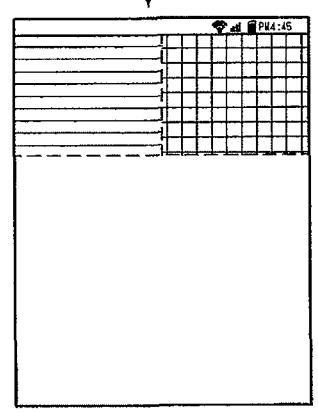
(b) Status2 :No event
▤ -Foreground Panel 1
▦ -Foreground Panel 2

MOBILE TERMINAL

CROSS-REFERENCE TO RELATED APPLICATIONS

Pursuant to 35 U.S.C. § 119(a), this application claims the benefit of earlier filing date and right of priority to Korean Patent Application No. 10-2013-0116647, filed on 30 Sep. 2013, the contents of which are incorporated by reference herein in their entirety.

BACKGROUND OF THE INVENTION

Field of the Invention

The present invention relates to a mobile terminal and corresponding method for providing a foreground panel of various styles based on a touch input received through a display screen.

Discussion of the Related Art

As functions of a terminal such as a personal computer, notebook, mobile phone, and smart phone are diversified, the terminal is now implemented in the form of a multimedia player equipped with multi-functions for capturing pictures or video, playing music or video files, game, and receiving broadcasting programs.

To support and enhance the increasing number of functions in a terminal, improving structural part and/or software part of the terminal is now being considered. As various types of terminals today, including mobile terminals, provide various complex functions, a menu structure is accordingly getting more complicated.

SUMMARY OF THE INVENTION

A technical object of the present invention is to provide a mobile terminal providing a guiding item to select a foreground panel desired by the user from among a plurality of foreground panels based on a touch input received through one peripheral region of a screen.

Another technical object of the present invention is to provide a mobile terminal capable of providing various foreground panels according to a direction of a touch input received through one peripheral region of a screen.

A yet another technical object of the present invention is to provide a mobile terminal capable of providing a varying foreground panel based on a drop position of a touch input received through one peripheral region of a screen.

Technical objects of the present invention are not limited to those listed above, but it should be noted that other technical objects not mentioned in this document will be clearly understood from descriptions below by those skilled in the art to which the present invention belongs.

To achieve the technical objects above, a mobile terminal according to one embodiment of the present invention includes a display unit providing a touch screen function; a storage unit storing a plurality of foreground panel composition information and a plurality of items corresponding to a plurality of foreground panels; and a controller. The controller displays at least one item from among the plurality of items on the display unit based on a touch input received through one peripheral region of a screen of the display unit. And if the received touch input is dragged to be dropped at a particular item from among the at least one item, the controller displays a foreground panel corresponding to the particular item by overlapping the foreground panel on at least part of the screen of the display unit based on foreground panel information corresponding to the particular item.

In addition, one peripheral region of the screen of the display unit can be a notification bar display region.

The controller can control the display unit so that the display region of a foreground panel corresponding to the particular item is expanded to overlap with at least part of the screen.

Reflecting an operation state of the mobile terminal, the controller can change a displayed item based on the received touch input or change a sub-item provided through a foreground panel corresponding to the particular item.

According to an application currently under execution, the controller can change a displayed item based on the received touch input or change a sub-item provided through a foreground panel corresponding to the particular item.

According to an execution state of the application currently under execution, the controller can change a displayed item based on the received touch input or change a sub-item provided through a foreground panel corresponding to the particular item.

Taking into account a usage pattern of the user according to an operation state of the mobile terminal, the controller can change a displayed item based on the received touch input or change a sub-item provided through a notification panel corresponding to one of the items.

Taking into account a usage pattern of the user with respect to an application currently under execution, the controller can change a displayed item based on the received touch input or change a sub-item provided through an alarm panel corresponding to one of the items.

Taking into account a usage pattern of the user in an execution state of the application currently under execution, the controller can change a displayed item based on the received touch input or change a sub-item provided through a foreground panel corresponding to the particular item.

While a notification foreground panel is displayed based on a selection with respect to the particular item, if a touch input of a first style is received by a sub-item notifying occurrence of an event related to a particular application, which is included in the notification foreground panel, the controller can display on the display unit an execution screen of a particular application taking into account the occurred event. If a touch input of a second style is received by the sub-item, however, the controller can display a user interface dedicated to carrying out a particular function of the first application predetermined in accordance with the occurred event by overlapping the user interface on at least part of the screen of the display unit.

If a first style touch input with respect to a sub-item notifying occurrence of a message reception event is received, which is included in the notification foreground panel, the controller can display on the display unit an execution screen of a messaging application taking into account occurrence of the message reception event. If a second style touch input with respect to the sub-item is received, however, the controller can display a user interface dedicated to carrying out a response message corresponding to the message reception event by overlapping the user interface on at least part of the screen of the display unit.

To achieve the technical objects above, a mobile terminal according to an embodiment of the present invention includes a display unit providing a touch screen function with a notification bar in one peripheral region; a storage unit storing foreground panel related information including a plurality of foreground panel composition information and a plurality of direction information corresponding to a plurality of foreground panels; and a controller. If a touch input is received through the notification bar display region, the controller can obtain direction information of the received touch input and based on the direction information of the obtained touch and the foreground panel related information, display a foreground panel corresponding to the direction information of the obtained touch input from among the plurality of foreground panels by overlapping the foreground panel on at least part of the screen of the display unit.

If a touch input received in the notification bar display region is retained for more than a predetermined period of time, the controller can display a plurality of items indicating a plurality of foreground panels corresponding to the plurality of direction information at a plurality of positions corresponding to the plurality of direction information in a region adjacent to the notification bar display region.

Reflecting an operation state of the mobile terminal, the controller can change the type of foreground panel that can be selected based on a direction of a touch input received through the notification bar region and foreground panel related information of at least one foreground panel.

Reflecting a usage pattern of the user according to an operation state of the mobile terminal, the controller can change the type of foreground panel that can be selected based on a direction of a touch input received through the notification bar region and foreground panel related information of at least one foreground panel.

To achieve the technical objects above, a mobile terminal according to a yet another embodiment of the present invention includes a display unit providing a touch screen function with a notification bar in one peripheral region; a storage unit storing foreground panel related information including a plurality of foreground panel composition information and a plurality of region information corresponding to a plurality of foreground panels; and a controller.

If a touch input received through the notification bar display region is dragged to be dropped, the controller obtains the position of the dropped touch input and based on the position information of the obtained touch input and the foreground panel related information, displays a foreground panel corresponding to region information including the position of the obtained touch input from among the plurality of foreground panels by overlapping the foreground panel on at least part of the screen of the display unit.

If a touch input received through the notification bar region for more than a predetermined period of time, the controller displays a plurality of items indicating a plurality of foreground panels corresponding to the plurality of region information on a plurality of regions corresponding to the plurality of region information in a region adjacent to the notification bar display region.

Reflecting an operation state of the mobile terminal, the controller can change the type of foreground panel that can be selected based on a drop position of a touch input received through the notification bar region and foreground panel related information of at least one foreground panel.

Reflecting a usage pattern of the user according to an operation state of the mobile terminal, the controller can change the type of foreground panel that can be selected based on a drop position of a touch input received through the notification bar region and foreground panel related information of at least one foreground panel.

A mobile terminal according to an embodiment of the present invention can provide a guiding item to select a foreground panel desired by the user from among a plurality of foreground panels based on a touch input received through one peripheral region of a screen. Then the user, by dragging the touch input to drop at a particular item, can select a foreground panel that he or she wants.

And the mobile terminal according to an embodiment of the present invention can provide various foreground panels according to a direction of a touch input received through one peripheral region of a screen.

Also, a mobile terminal according to an embodiment of the present invention can provide a varying foreground panel based on a position at which a touch input received through one peripheral region of a screen is dropped.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 shows an example where a sub-item provided through a foreground panel is changed according to an application executed in a mobile terminal according to an embodiment of the present invention;

FIG. 10 shows another example where a mobile terminal according to an embodiment of the present invention supports writing a response message with respect to a message received directly from a notification foreground panel;

FIG. 19 shows one type of user interface provided through a notification foreground panel provided by a mobile terminal according to an embodiment of the present invention;

FIG. 30 shows an example where in a mobile terminal according to an embodiment of the present invention capable of selecting a foreground panel based on a drop position of a touch input, a direction that the user can choose is changed according to an operation state of the mobile terminal

DESCRIPTION OF EMBODIMENTS

Arrangements and embodiments may now be described more fully with reference to the accompanying drawings, in which embodiments may be shown. Embodiments may, however, be embodied in many different forms and should not be construed as being limited to embodiments set forth herein; rather, embodiments may be provided so that this invention will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
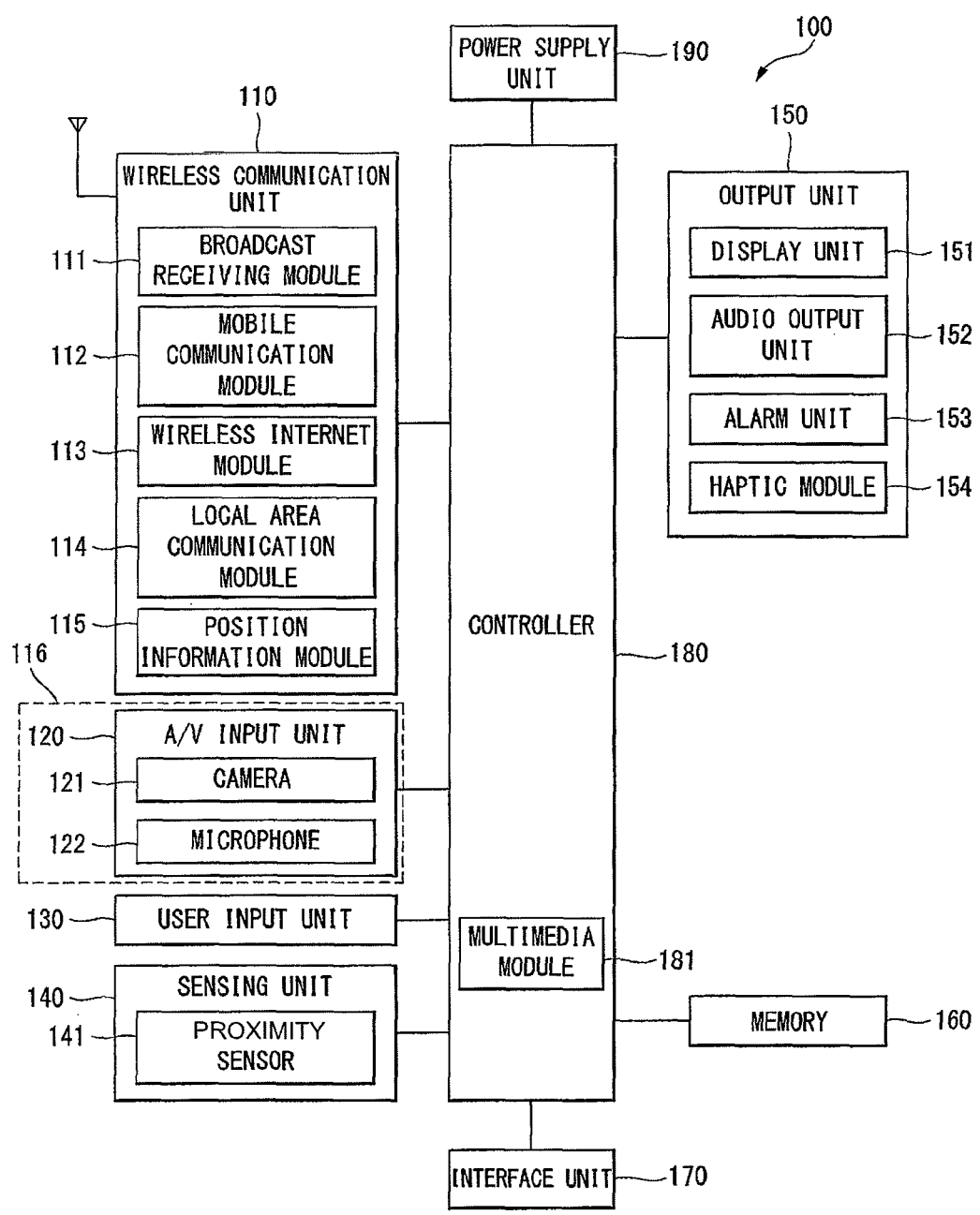
FIG. 1 is a block diagram of a mobile terminal according to an embodiment.

FIG. 1 is a block diagram of a mobile terminal according to an embodiment. Other embodiments, configurations and arrangements may also be provided. As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply unit 190. The components shown in FIG. 1 may vary.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or ZigBee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display unit 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

As shown in FIG. 1, the A/V input unit 120 and the user input unit 130 can be implemented by a single one input unit 116. Various input data generated by the input unit 116 can be used to activate or deactivate a memo-related function performed by a mobile terminal 100 according to an embodiment of the present invention, such as a memo writing function, memo storing function, and memo inserting function through a display unit 151 implemented in the form of a touch screen. The input data can include an image received through the camera 121, user voice received through the microphone 122, and touch input received through the display unit 151. However, the technical scope of the present invention is not limited to the types of input data above.

The sensing unit 140 can sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply unit 190 supplies power and/or whether the interface 170 is connected to an external device. The sensing unit 140 may also include a proximity sensor. The sensing unit 140 may sense a motion of the mobile terminal 100.

The output unit 150 may generate visual, auditory and/or tactile output, and the output unit 150 may include the display unit 151, an audio output unit 152, an alarm unit 153 and a haptic module 154. The display unit 151 may display information processed by the mobile terminal 100. The display unit 151 may display a user interface (UI) and/or a graphic user interface (GUI) related to a telephone call when the mobile terminal 100 is in the call mode. The display unit 151 may also display a captured and/or received image, a UI or a GUI when the mobile terminal 100 is in the video telephony mode or the photographing mode.

The display unit 151 may include at least one of a liquid crystal display, a thin film transistor liquid crystal display, an organic light-emitting diode display, a flexible display and/or a three-dimensional display. The display unit 151 may be of a transparent type or a light transmissive type. That is, the display unit 151 may include a transparent display.

The transparent display may be a transparent liquid crystal display. A rear structure of the display unit 151 may also be of a light transmissive type. Accordingly, a user may see an object located behind the body (of the mobile terminal 100) through the transparent area of the body of the mobile terminal 100 that is occupied by the display unit 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display unit 151 and a sensor sensing touch (hereafter referred to as a touch sensor) form a layered structure that is referred to as a touch screen, the display unit 151 may be used as an input device in addition to an output device. The touch sensor may be in the form of a touch film, a touch sheet, and/or a touch pad, for example.

The touch sensor may convert a variation in pressure applied to a specific portion of the display unit 151 or a variation in capacitance generated at a specific portion of the display unit 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display unit 151.

The proximity sensor 141 of the sensing unit 140 may be located in an internal region of the mobile terminal 100, surrounded by the touch screen, and/or near the touch screen. The proximity sensor 141 can sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 can sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output unit 152 may output audio data received from the wireless communication unit 110 or stored in the memory 160 in a call signal receiving mode, a telephone call mode or a recording mode, a speech recognition mode and a broadcasting receiving mode. The audio output unit 152 may output audio signals related to functions, such as a call signal incoming tone and a message incoming tone, performed in the mobile terminal 100. The audio output unit 152 may include a receiver, a speaker, a buzzer, and/or the like. The audio output unit 152 may output sounds through an earphone jack. The user may hear the sounds by connecting an earphone to the earphone jack.

The alarm unit 153 may output a signal for indicating generation of an event of the mobile terminal 100. For example, an alarm may be generated when receiving a call signal, receiving a message, inputting a key signal, and/or inputting a touch. The alarm unit 153 may also output signals in forms different from video signals or audio signals, for example, a signal for indicating generation of an event through vibration. The video signals and/or the audio signals may also be output through the display unit 151 or the audio output unit 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 can control overall operations of the mobile terminal 100. For example, the controller 180 can perform control and processing for voice communication, data communication and/or video telephony. The controller 180 can also include a multimedia module 181 for playing multimedia. The multimedia module 181 may be included in the controller 180 or may be separated from the controller 180.

The controller 180 can perform a pattern recognition process capable of recognizing handwriting input or picture-drawing input applied to the touch screen as characters or images. The power supply unit 190 may receive external power and internal power and provide power required for operations of the components of the mobile terminal 100 under control of the controller 180.

According to a hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to a software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
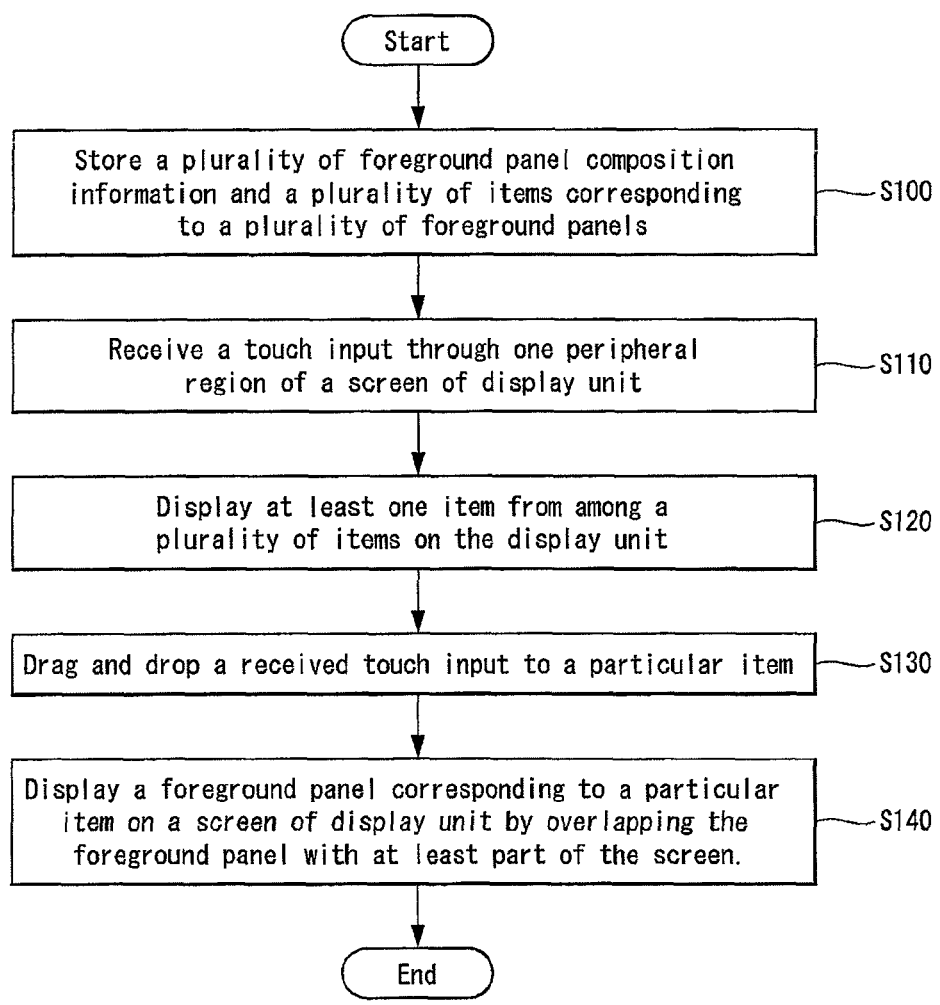
FIG. 2 is a flow diagram illustrating one example of a method for operating a mobile terminal according to an embodiment of the present invention.

Next, FIG. 2 is a flow diagram illustrating one example of a method for operating a mobile terminal according to an embodiment of the present invention. First, a plurality of foreground panel composition information and a plurality of items corresponding to a plurality of foreground panels are stored in the memory 160 (S100). Here, the foreground panel refers to a window displayed being overlapped with a current screen of the display unit 151 to perform a function over an application or a function currently under execution.

A typical example of a foreground panel is a notification panel displayed being overlapped with a screen, which is unfolded down from an upper part of the screen based on a stroke with respect to a notification bar in a smart phone equipped with the Android OS.

While information related to the plurality of foreground panels is stored, a display unit 151 providing a touch screen function receives a touch input through one peripheral region of the display unit 151 (S110). Here, the display unit 151 displays a waiting or idle screen, an execution screen of a particular screen, or a lock screen. However, the technical scope of the present invention is not limited to the illustrative screens above.

Meanwhile, one peripheral region of the screen of the display unit 151 may correspond to an upper region of the screen of the display unit 151, a lower region, or one of both sides of the screen. Also, one peripheral region of the screen of the display unit 151 may correspond to a region in which a notification bar is displayed.

If a touch input is received through one peripheral region of the screen of the display unit 151, the controller 180 displays at least one item from among a plurality of items stored in the memory 160 on the display unit 151 (S120). Here, each of the plurality of items may include an icon indicating the corresponding function category and further include text indicating the corresponding function category.

The item displayed on the display unit 151 can be changed according to an operation state of the mobile terminal 100. Here, an operation state of the mobile terminal can include a type of application under execution, the number of applications under execution, an execution state of an application under execution, and a network connection state of the mobile terminal 100. However, the technical scope of the present invention is not limited to the illustrative states above.

Also, an item displayed on the display unit 151 can be changed according to a usage pattern of the user dependent on an operation state of the mobile terminal 100. While the at least one item is displayed on the display unit 151, the received touch input is dragged and dropped to a particular item from among the at least one item (S130).

If the received touch input is dropped to the particular item, the controller 180 displays a foreground panel corresponding to the particular item by overlapping the foreground panel on at least part of the screen of the display unit 151 (S140). Meanwhile, the foreground panel corresponding to the particular item can be transparent, opaque, or translucent. Also, the user can change the degree of transparency of the foreground panel corresponding to the particular item.

The foreground panel provided by a related art mobile terminal contains an excessively large number of items. Thus, there are times when the user finds it difficult to search the foreground panel provided in the related art mobile terminal for an item that the user wants. As described with reference to FIG. 2, however, the mobile terminal 100 according to an embodiment of the present invention can selectively provide a foreground panel related to a function desired by the user from among a plurality of foreground panels.

The foreground panel in the related art mobile terminal is displayed across the whole screen of the display unit. Therefore, visual information provided through a previously displayed screen is blocked. As described with reference to FIG. 2, the foreground panel of the mobile terminal 100 according to an embodiment of the present invention can be displayed being overlapped only with part of the screen of the display unit 151.

Therefore, the user can still receive visual information provided through the previously displayed screen except for the visual information provided through the region overlapped by the foreground panel. If the foreground panel is transparent or translucent, visual information through the previously displayed screen may not be blocked at all.

Figure 3:
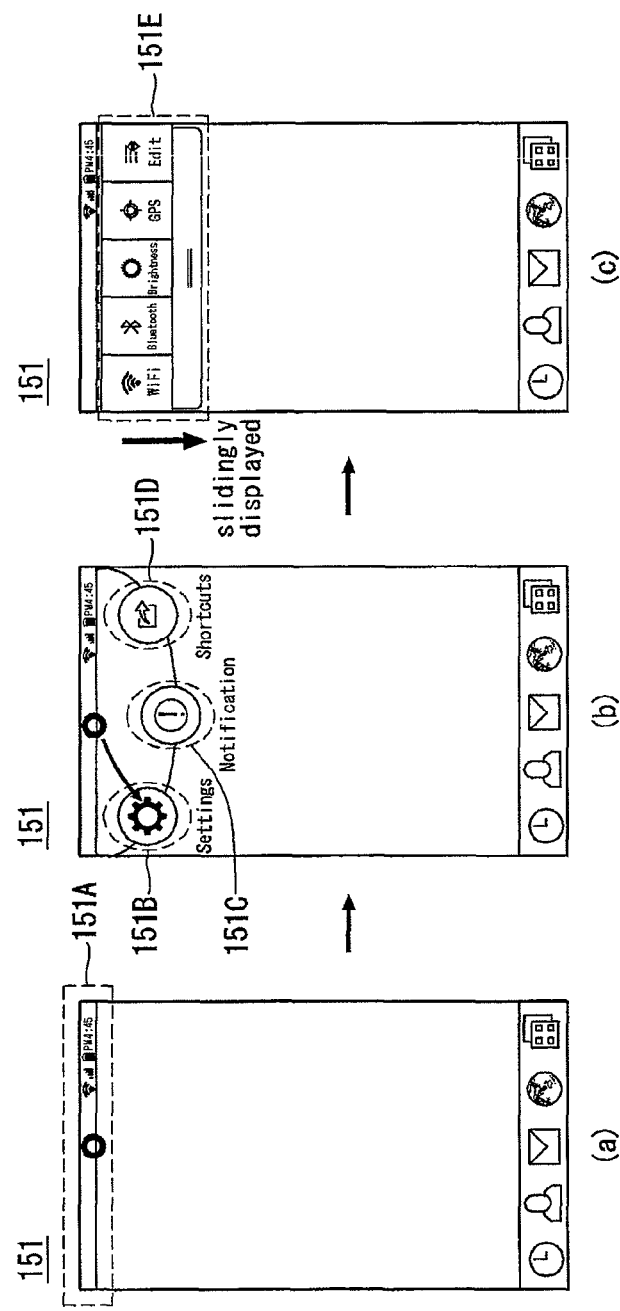
FIG. 3 shows one example where a mobile terminal according to an embodiment of the present invention provides a foreground panel.

Next, FIG. 3 shows one example where a mobile terminal 100 according to an embodiment of the present invention provides a foreground panel. As shown in FIG. 3(a), the user touches a region 151A in which a notification bar is displayed, one peripheral region of the screen of the display unit 151. Then the controller 180, as shown in FIG. 3(b), displays a plurality of items 151B, 151C, and 151D on the screen of the display unit 151.

One item 151B of the plurality of items corresponds to a foreground panel related to an environment setting function of the mobile terminal 100; the second item 151C corresponds to a notification panel which is a foreground panel related to an event occurrence notification function; and the third items 151D corresponds to a foreground panel related to a shortcut function. In addition, the items 151B, 151C, and 151D shown in FIG. 3 are only examples according to one embodiment of the present invention. Therefore, the technical scope of the present invention is not limited to the illustrative items above.

FIG. 3(b) shows when the user drags a touch input with respect to the notification bar display region 151A to drop to the item 151B corresponding to the environment setting function category from among the plurality of items. Then the controller 180, as shown in FIG. 3(c), displays the foreground panel 151E meant for environment setting corresponding to the item 151B by overlapping the foreground panel on part of the screen of the display unit 151. Afterwards, the user can perform environment setting according to his or her needs by selecting a sub-item included in the foreground panel 151E.

Meanwhile, the foreground panel 151E can be displayed being overlapped slidingly with the screen of the display unit 151 as the display region is gradually expanded down from an upper part of the screen at which a touch input has been received. This operating pattern applies the same to the notification foreground panel 151E shown in FIG. 4.

Figure 4:
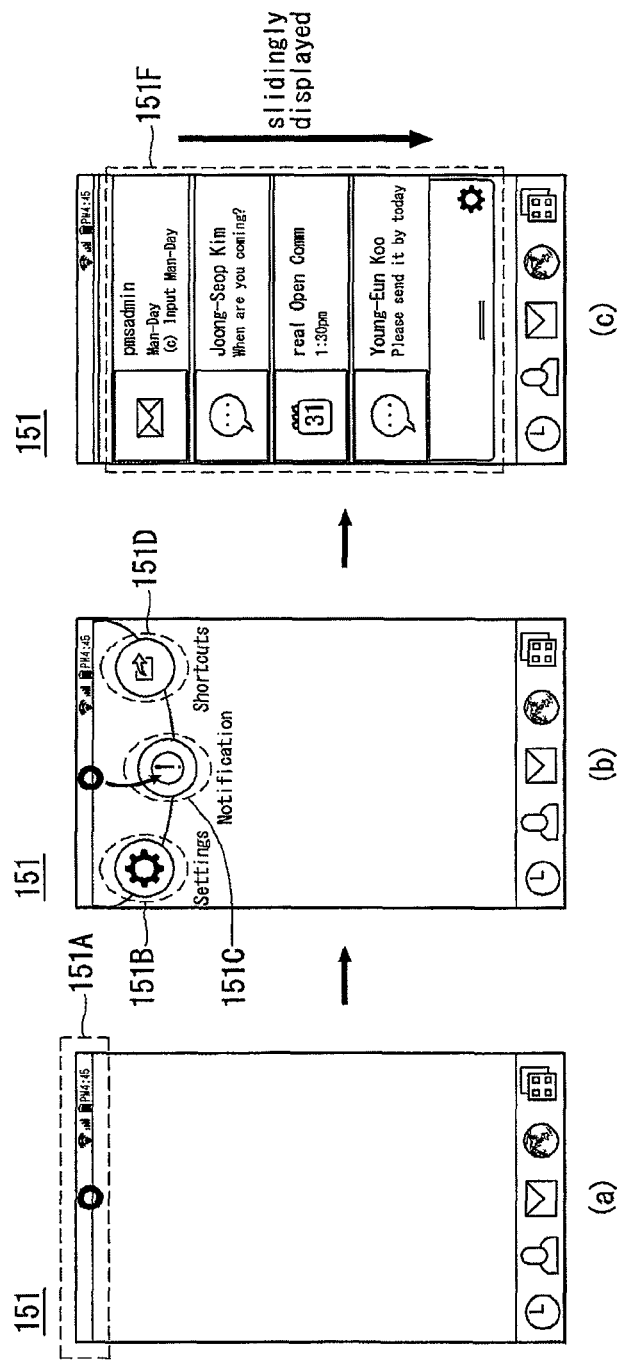
FIG. 4 shows another example where a mobile terminal according to an embodiment of the present invention provides a foreground panel.

FIG. 4 shows another example where a mobile terminal 100 according to an embodiment of the present invention provides a foreground panel. FIG. 4 illustrates when a plurality of items 151B, 151C, and 151D are displayed on a screen based on a touch input received through a plurality of notification bar display regions 151A; and if the received touch input is dragged to be dropped to the item 151C corresponding to a notification foreground panel, the notification foreground panel 151F is displayed being overlapped with the screen of the display unit 151. Then the user can check the notification foreground panel 151F to identify an occurred event.

Figure 5:
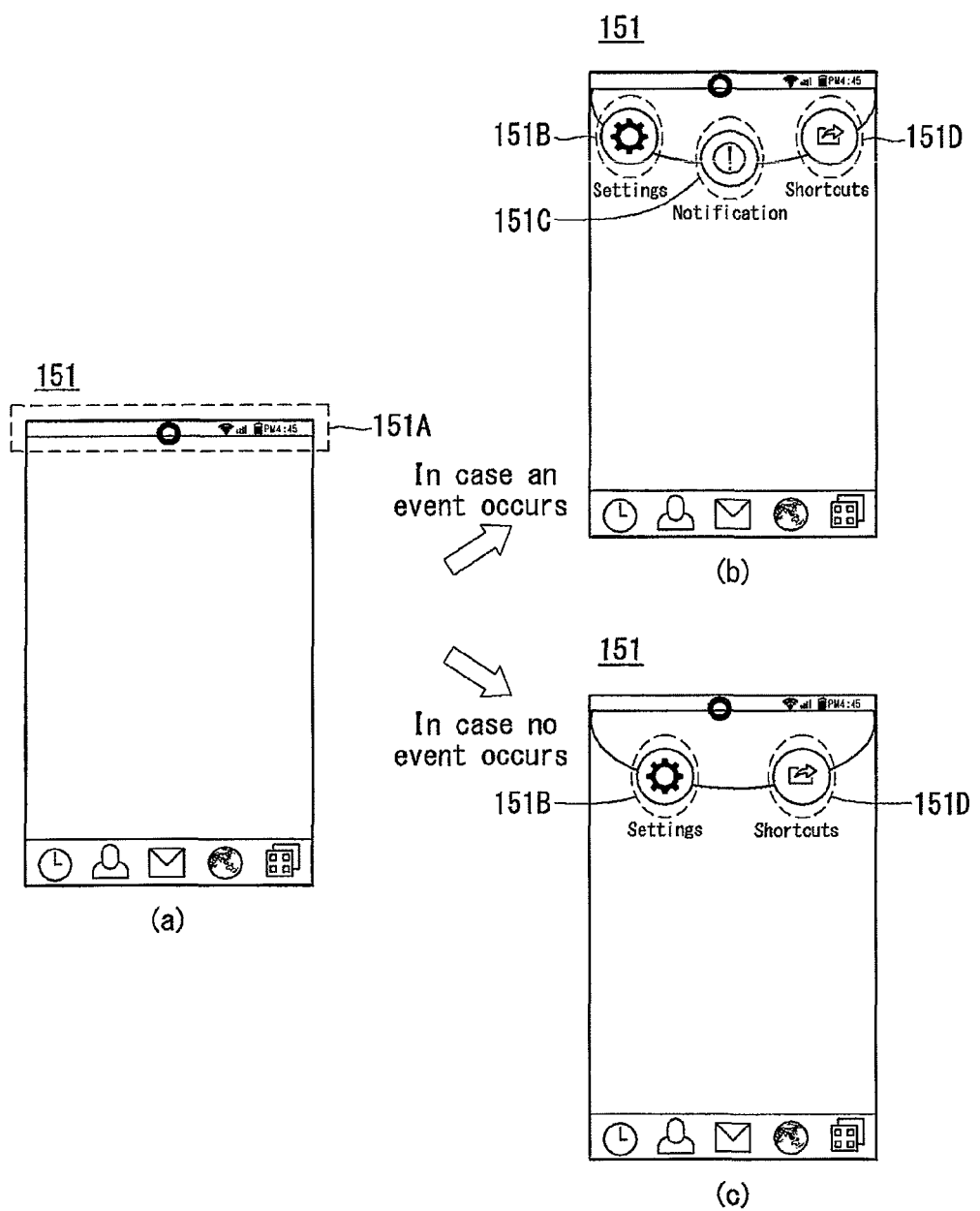
FIG. 5 shows examples of a procedure for a mobile terminal according to an embodiment of the present invention to provide a foreground panel.

FIG. 5 shows examples of a procedure for a mobile terminal 100 according to an embodiment of the present invention to provide a foreground panel. More specifically, FIG. 5 illustrates that items, based on which the foreground panel is provided, can be displayed differently according to an operation state of the mobile terminal 100.

As shown in FIG. 5(a), the user touches a region 151A displaying a notification bar which forms one peripheral region of the screen of the display unit 151. When an event is generated and an event generation notification function needs to be performed through the notification foreground panel, the controller 180, as shown in FIG. 5(b), displays an item 151C corresponding to the notification foreground panel on the display unit 151. Then the user drags the touch input with respect to the notification bar display region to drop to the item, and the controller 180 displays the notification foreground panel.

When there is no need to perform the event generation notification function through the notification foreground panel as no event is generated, the controller 180, as shown in FIG. 5(c), does not display the item corresponding to the notification foreground panel on the display unit 151. In this instance, the user can receive only the foreground panel corresponding to the setting function and the foreground panel corresponding to the shortcut function through selection of an item displayed on the display unit 151.

FIG. 5 illustrates that an item displaying provision of a foreground panel on the display unit 151 can be changed based on occurrence of an event. However, the operation state considered in the mobile terminal 100 according to an embodiment of the present invention is not limited to occurrence of an event. For example, taking into account the type of application under execution or operation state including the execution state of the application under execution, the mobile terminal 100 can change the item displayed on the display unit 151 to provide the foreground panel.

Furthermore, the mobile terminal 100 according to an embodiment of the present invention can change the item displayed on the display unit 151 to provide the foreground panel by taking into account the usage pattern of the user in an operation state of the mobile terminal 100. The usage patterns of the user according to the respective operation states of the mobile terminal 100 are preferably stored beforehand in the memory 160.

Next, FIG. 6 shows an example where a sub-item provided through a foreground panel is changed according to an application executed in a mobile terminal 100 according to an embodiment of the present invention. As shown in FIG. 3(b), examples of FIG. 6 assume that the user drags a touch input received through the notification bar display region 151A to drop to the item 151B corresponding to a foreground panel for environment setting.

With reference to FIG. 6(a), while a video play application is under execution, the foreground panel for environment setting includes a sub-item 151E1 for screen brightness control and a sub-item 151E2 for volume control. With reference to FIG. 6(b), however, when a web browsing application is under execution, the foreground panel for environment setting includes the sub-item 151E1 for screen brightness control but not the sub-item 151E2 for volume control. This is because the importance of volume control is relatively weak for a web browsing application.

Further, with reference to FIG. 6(c), while a radio application is under execution, the foreground panel for environment setting includes the sub-item 151E2 for volume control but not the sub-item 151E1 for screen brightness control. This is because the importance of screen brightness control is relatively weak for a radio application.

As described with reference to FIG. 6, in the mobile terminal 100 according to an embodiment of the present invention, a sub-item provided through a foreground panel of the same category can be changed according to an application under execution. However, a sub-item provided through a foreground panel of the same category in the mobile terminal 100 of the present invention is not necessarily changed only according to an application under execution.

For example, the mobile terminal 100 of the present invention can change a sub-item provided through a foreground panel of the same category by taking into account the operation state of the mobile terminal 100, usage pattern of the user in the operation state of the mobile terminal 100, and the like. In some instances, the usage pattern of the user according to the operation state of the mobile terminal 100 is preferably stored beforehand in the memory 160.

Figure 7:
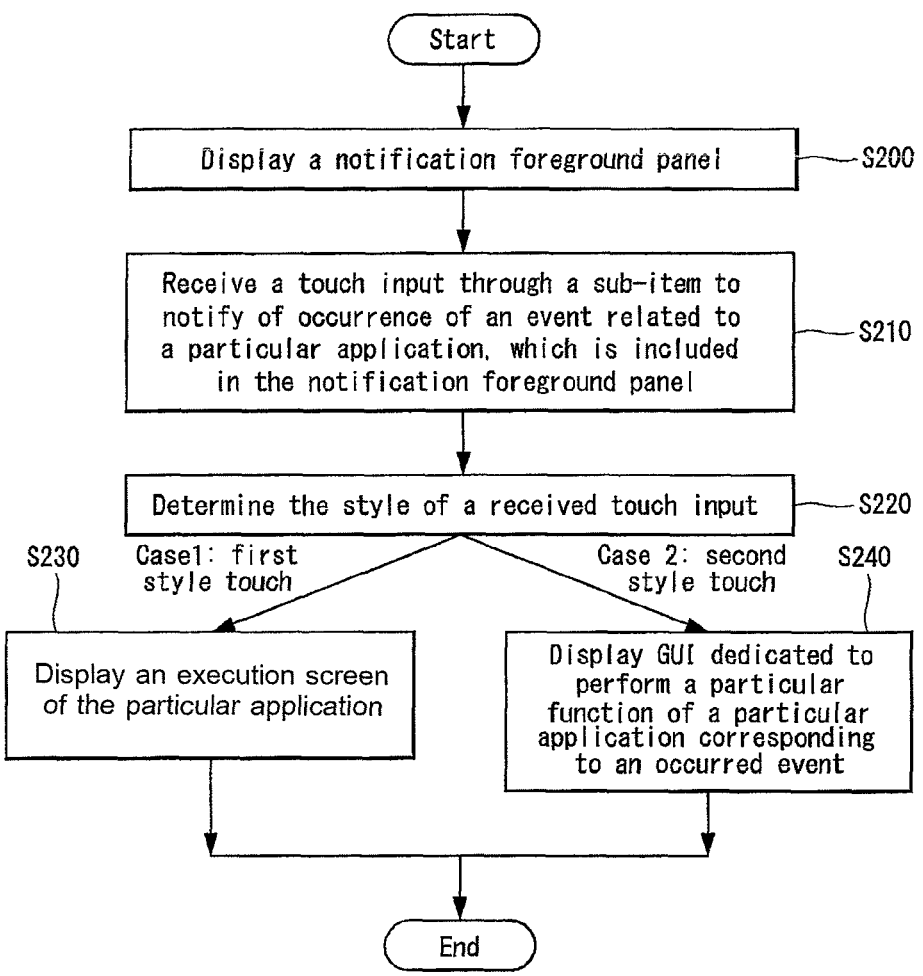
FIG. 7 is a flow diagram illustrating another example of a method for operating a mobile terminal according to an embodiment of the present invention.

FIG. 7 is a flow diagram illustrating another example of a method for operating a mobile terminal according to an embodiment of the present invention. First, a notification foreground panel is displayed on the display unit 151 (S200). The notification foreground panel may be displayed according to a method for operating a mobile terminal as shown in FIG. 2. However, the technical scope of the present invention is not limited to the aforementioned case.

A touch input is received through a sub-item notifying an occurrence of an event related to a particular application, which is included in the notification foreground panel (S210). Then the controller 180 determines the style of the received touch input (S220).

If the received touch input is a predetermined touch input of a first style, the controller 180 performs the particular application by taking into account the occurrence of the event and displays an execution screen of the particular application on the display unit 151 (S230). When the received touch input is a predetermined touch input of a second style, the controller 180 displays on the display unit 151 a user interface dedicated to perform a particular function of the particular application corresponding to the generated event (S240).

Figure 8:
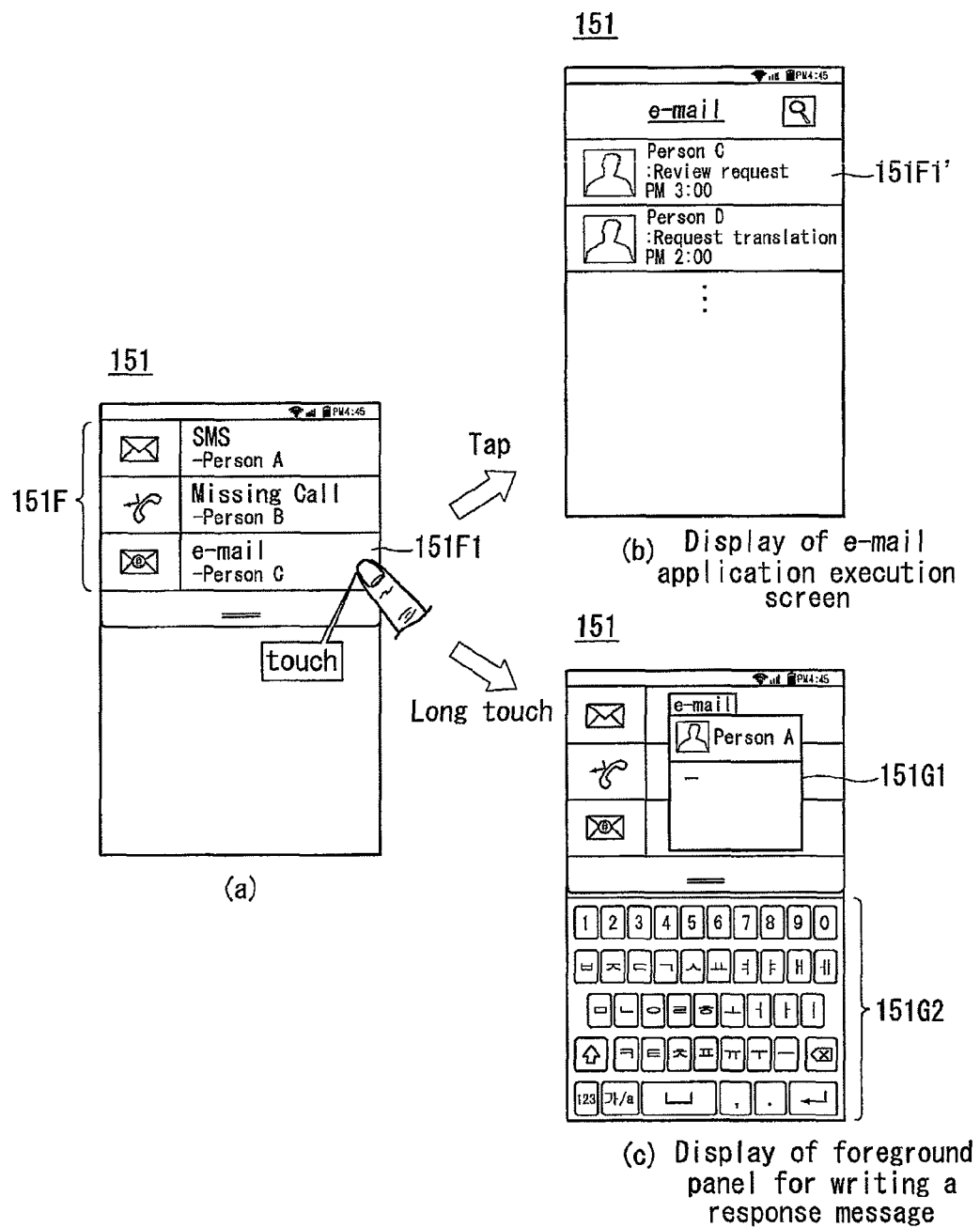
FIG. 8 shows an example where a user interface displayed on a display unit is changed according to a touch style with respect to a sub-item of a notification foreground panel according to a method for operating a mobile terminal of FIG. 7.

FIG. 8 shows an example where a user interface displayed on a display unit 151 is changed according to a touch style with respect to a sub-item of a notification foreground panel according to a method for operating a mobile terminal of FIG. 7. FIG. 8(*a*) illustrates when the user touches a sub-item 151F1 notifying of occurrence of an e-mail reception event while the notification foreground panel 151F is displayed on the display unit 151. In addition, the controller 180 determines the style of a received touch input.

If the received touch input corresponds to a Tap key which is a first style touch input, the controller 180, as shown in FIG. 8(*b*), displays on the display unit 151 an execution screen of an e-mail application taking into account the occurrence of the e-mail reception event. The execution screen of the e-mail application can be the same as the e-mail application execution screen according to a related art execution procedure.

However, if the received touch input is a long touch which is a second style touch input, the controller 180, as shown in FIG. 8(*c*), displays on the display unit 151 the user interface 151G1 and 151G2 dedicated to a function of writing response emails corresponding to the e-mail reception event.

As shown in FIG. 8(*c*), the user interface can include a window 151G1 in which an input message is displayed and a virtual keyboard 151G2. A response e-mail with respect to a received e-mail can be immediately prepared through the user interface. In other words, the user can write a response message with respect to a received e-mail immediately by a simple operation (namely without having to perform an e-mail application separately) through the notification foreground panel 151F.

Meanwhile, the user interface 151G1 and 151G2 shown in FIG. 8(*c*) is another foreground panel displayed being overlapped on the previously displayed notification foreground panel 151F. In addition, the touch function may be kept active for the notification foreground panel 151F region which is not overlapped with the user interface. Then the user can touch a different part from the user interface display region to perform another task.

Different from what is shown in FIG. 8(*c*), when the user interface is displayed on the display unit 151, the controller 180 can cancel display of the notification foreground panel 151F displayed earlier and display the user interface 151G1 and 151G2 by overlapping the user interface on the screen displayed on the display unit 151 before the notification foreground panel 151F is displayed. In this instance, the touch function can be kept active for the part not overlapping with the user interface.

Figure 9:
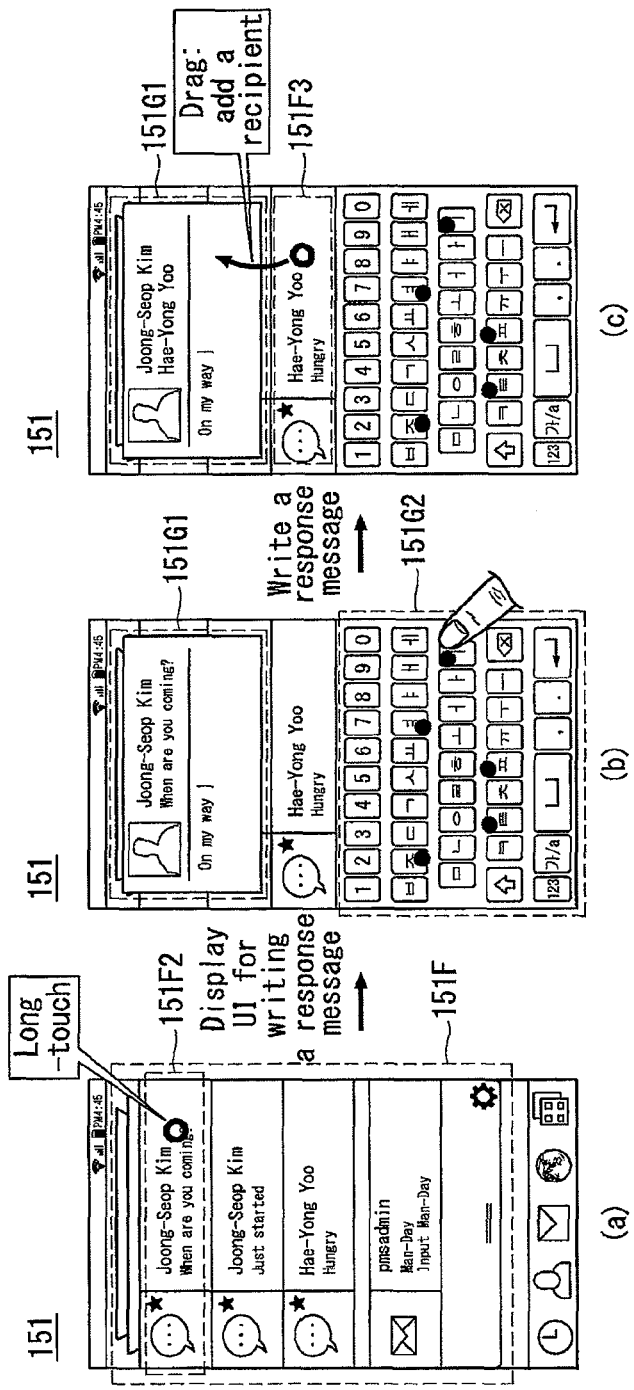
FIG. 9 shows one example where a mobile terminal according to an embodiment of the present invention supports writing a response message with respect to a message received directly from a notification foreground panel.

Next, FIG. 9 shows one example where a mobile terminal 100 according to an embodiment of the present invention supports writing a response message with respect to a message received directly from a notification foreground panel 151F.

In particular, FIG. 9(*a*) shows when the user makes a long touch on one 151F2 of sub-items of the notification foreground panel 151F. Then, as shown in FIG. 9(*b*), the controller 180 displays on the display unit 151 the user interface 151G1 and 151G2 for writing a response message. Then the user can write and transmit a response message through the user interface 151G1 and 151G2.

Meanwhile, when the user touches a different sub-item 151F3 included in the notification foreground panel 151F and drags the different sub-item to the user interface 151G1 and 151G2, the controller 180, as shown in FIG. 9(*c*), can add a sender of the sub-item 151F3 as a recipient of a response message under preparation.

FIG. 10 shows another example where a mobile terminal 100 according to an embodiment of the present invention supports writing a response message with respect to a message received directly from a notification foreground panel 151F. In particular, FIG. 10(*a*) to FIG. 10(*c*) show when the user drags a touch on a sub-item 151F2 included in the notification foreground panel 151F to another sub-item 151F3. Then, as shown in FIG. 10(*c*), the controller 180 can display on the display unit 151 a user interface for writing a response message having senders of reception messages corresponding to the sub-items as common recipients.

Figure 11:
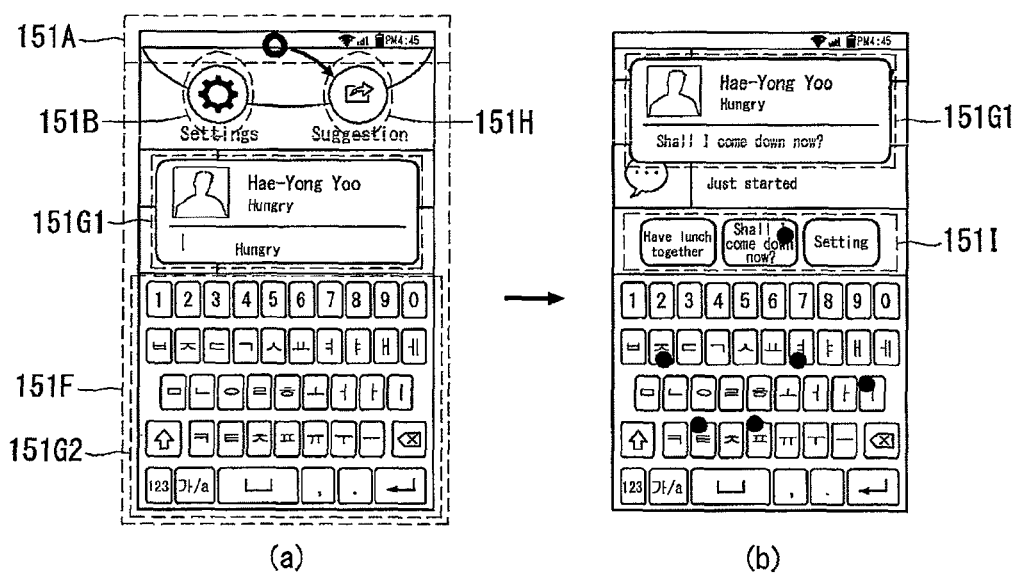
FIG. 11 shows a yet another example where a mobile terminal according to an embodiment of the present invention supports writing a response message with respect to a message received directly in a notification foreground panel.

Next, FIG. 11 shows yet another example where a mobile terminal 100 according to an embodiment of the present invention supports writing a response message with respect to a message received directly in a notification foreground panel 151F.

In particular, FIG. 11(*a*) shows when the user touches a notification bar display region 151A in the middle of writing a response message based on a simple operation with respect to the notification foreground panel 151F, an item 151B corresponding to an environment setting function and an item 151H corresponding to a common phrase suggestion function are displayed on the display unit 151. The figure also shows that the user drags and drops the touch to the item 151H.

Then, as shown in FIG. 11(*b*), the controller 180 can display on the display unit 151 the common phrase suggestion region 151I including a plurality of common phrases. Then the user can select a common phrase contained in the common phrase suggestion region 151I and the selection common phrase is displayed on a message input window 151G1. Common phrases of the mobile terminal 100 can be selected by considering a message sender, message reception time, and the like based on the result of analyzing the content of a received message. Also, the user may register the common phrases beforehand.

Figure 12:
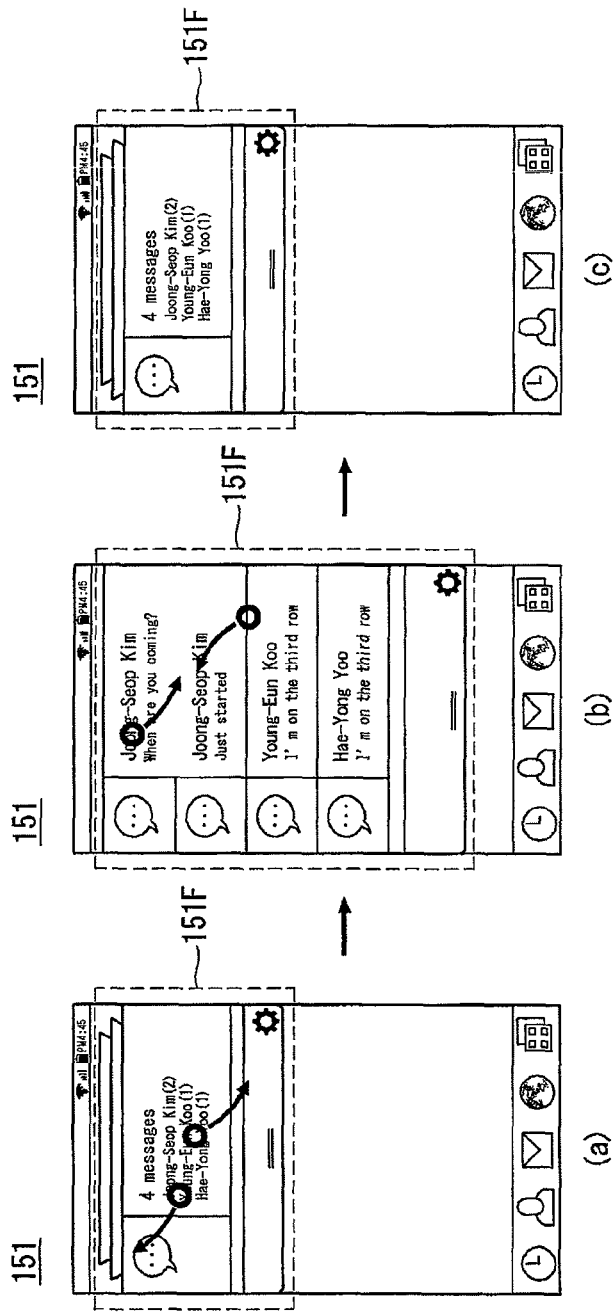
FIG. 12 shows various types of notification foreground panel provided by a mobile terminal according to an embodiment of the present invention.

FIG. 12 shows various types of notification foreground panel 151F provided by a mobile terminal 100 according to an embodiment of the present invention. With reference to FIG. 12(*a*), when multiple messages are received, the mobile terminal 100 displays on the notification foreground panel 151F with only simplified information comprising the recipient of the message and the number of messages per recipient. Meanwhile, the mobile terminal 100 can display the simplified information with respect to different types of messages on one region as shown in FIG. 12(a).

When a pinch-out touch is received on the notification foreground panel 151F under the state of FIG. 12(a), the controller 180, as shown in FIG. 12(b), provides more specific content of the message through a plurality of regions of the notification foreground panel 151F. When a pinch-in touch is received on the notification foreground panel 151F under the state of FIG. 12(b), the controller 180, as shown in FIG. 12(c), recovers the form of the notification foreground panel 151F back to the state of FIG. 12(c).

Figure 13:
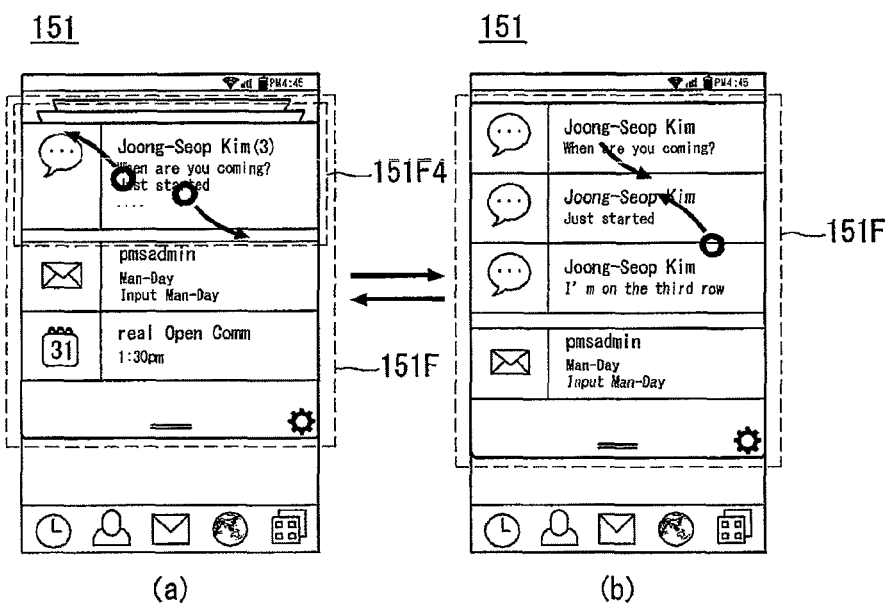
FIG. 13 shows various types of user interface employing a notification foreground panel provided by a mobile terminal according to an embodiment of the present invention.

FIG. 13 shows various types of user interface employing a notification foreground panel 151F provided by a mobile terminal 100 according to an embodiment of the present invention. The sub-item 151F4 of FIG. 13(a) shows when a plurality of received messages, the sender of which is "Joong-Seop Kim," are displayed as a group in one region. The figure indicates that multiple messages have been received.

The number 3 in the sub-item 151F4 implies that three messages have been received. If a pinch-out touch is received from the sub-item 151F4 of FIG. 13(a), the controller 180, as shown in FIG. 13(c), displays three messages, the sender of which is "Joong-Seop Kim," on three separate regions.

When a pinch-in touch is received on the region where the three messages are displayed as shown in FIG. 13(b), the display of the notification foreground panel 151F returns back to the shape of FIG. 13(a). Meanwhile, with reference to FIG. 13, it can be known that the sub-item 151F4 displays only the content of two messages, while the third one is not displayed. The symbol of " . . . " in FIG. 13(a) indicates that there is a message not displayed in the sub-item 151F4.

Figure 14:
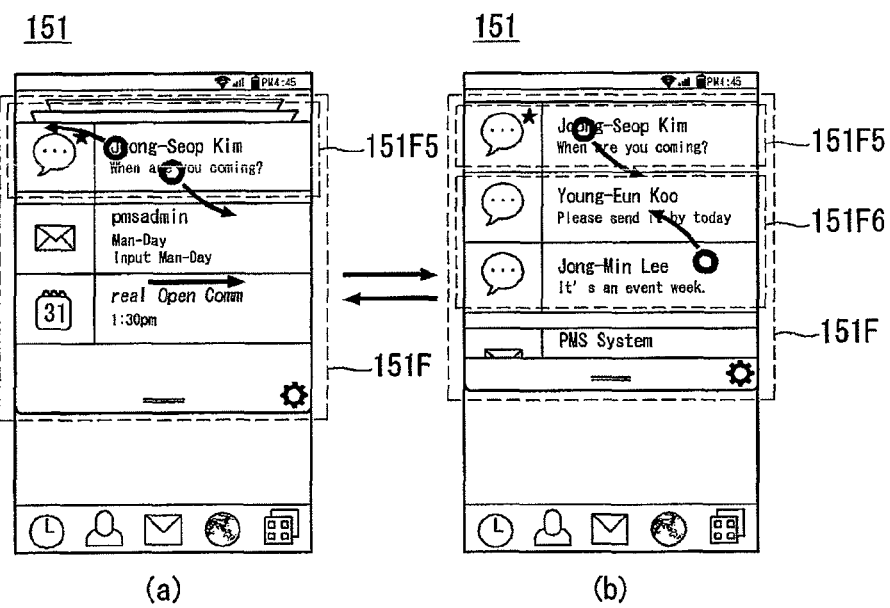
FIG. 14 shows various types of user interface provided through a notification foreground panel provided by a mobile terminal according to an embodiment of the present invention.

FIG. 14 shows various types of user interface provided through a notification foreground panel 151F provided by a mobile terminal 100 according to an embodiment of the present invention. In particular, FIG. 14(a) illustrates when a pinch-in touch is received with respect to a particular sub-item 151F5 included in the notification foreground panel 151F. In this instance, as shown in FIG. 14(b), the controller 180 can further display sub-items 151F6 corresponding to other messages of the same type received before.

Under the state of FIG. 14(b), when a pinch-out touch is received with respect to the region where the sub-items 151F5 and 151F6 are displayed, the controller 180 can recover the display state of the notification foreground panel 151F back to the state of FIG. 14(a). Meanwhile, the object in the shape of a star displayed on the sub-item 151F5 can indicate that the sender of a message is predefined in the form of favorites or designated an important person by the user.

Figure 15:
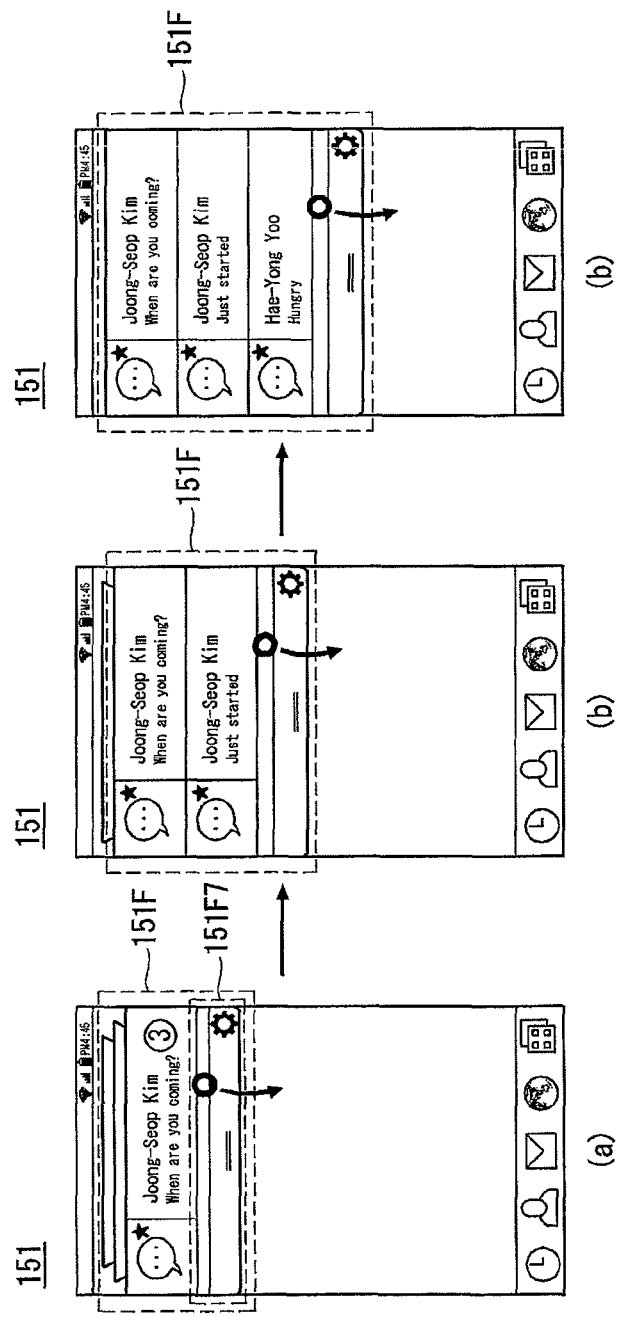
FIG. 15 shows one type of user interface provided through a notification foreground panel provided by a mobile terminal according to an embodiment of the present invention.

FIG. 15 shows one type of user interface provided through a notification foreground panel 151F provided by a mobile terminal 100 according to an embodiment of the present invention. In particular, FIG. 15(a) shows when an item corresponding to a message, the sender of which is "Joong-Seop Kim," is displayed on the notification foreground panel 151F. The number 3 displayed at the sub-item indicates that three messages from the same sender have been received.

The region 151F7 below the sub-item can indicate that a message has been received by an application designated as one of favorites. This can be applied the same to other embodiments. If the user touches the region and drags it down, the controller 180, as shown in FIGS. 15(b) and (c), can display sub-items corresponding to the remaining two messages to the notification foreground panel 151F.

Figure 16:
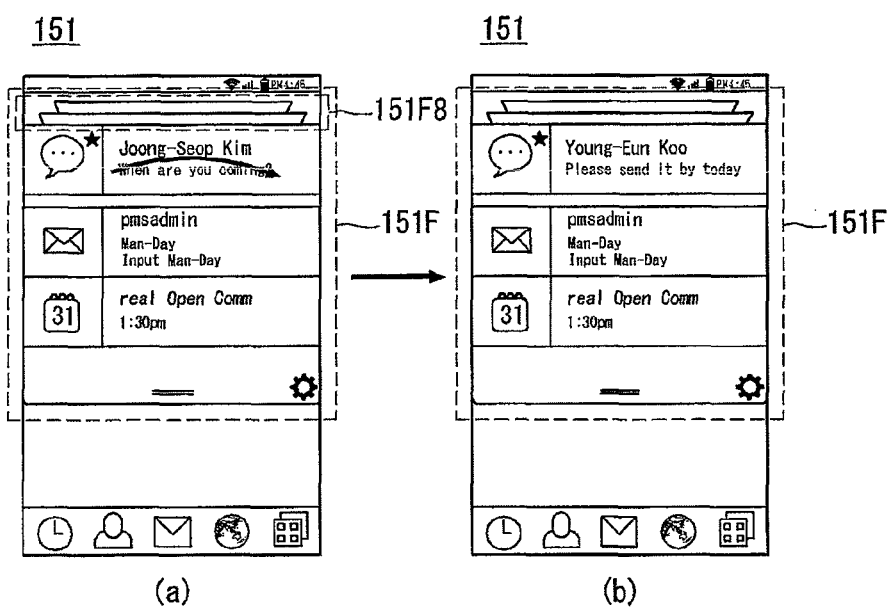
FIG. 16 shows one type of user interface provided through a notification foreground panel provided by a mobile terminal according to an embodiment of the present invention.

FIG. 16 shows one type of user interface provided through a notification foreground panel 151F provided by a mobile terminal 100 according to an embodiment of the present invention. In particular, FIG. 16(a) shows when a flicking touch input in the right direction is received with respect to a sub-item included in the notification foreground panel 151F.

Here, in an upper region 151F8 of the sub-item, a plurality of layers are displayed, which indicate that multiple messages have been received by the same application. The display of the plurality of layers indicates that multiple items having common features among them are overlapped with each other. This situation applies the same to other embodiments. Meanwhile, common features among items can be classified to two cases: those related to the same application and those related to the same counterpart.

If the flicking touch input is received, the controller 180, as shown in FIG. 16(b), can provide a sub-item corresponding to a different message received by the same application. On the contrary, if a flicking touch in the left direction is received with respect to a sub-item corresponding to the received, different message in the situation as shown in FIG. 16(b), the controller 180 can return the display state of the notification foreground panel 151F back to the state of FIG. 16(a).

Figure 17:
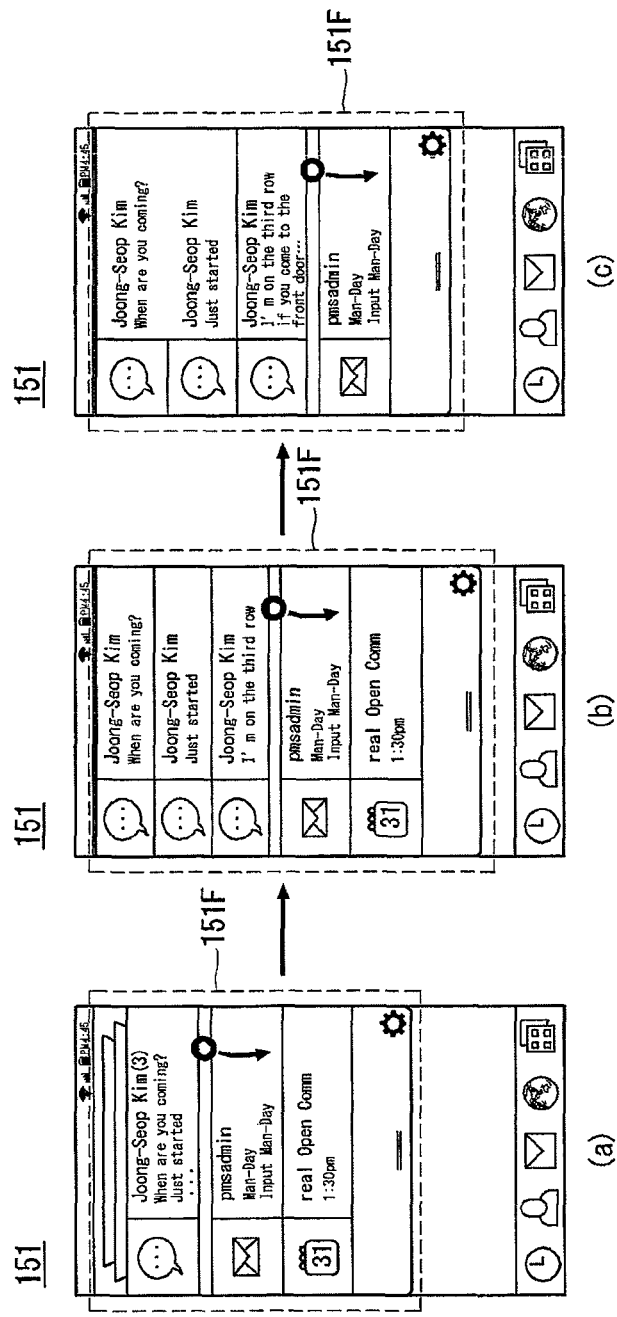
FIG. 17 shows one type of user interface provided through a notification foreground panel provided by a mobile terminal according to an embodiment of the present invention.

FIG. 17 shows one type of user interface provided through a notification foreground panel 151F provided by a mobile terminal 100 according to an embodiment of the present invention. In particular, FIG. 17(a) shows when a sender touches a lower region of the item indicating that the same three messages have been received and starts to drag the region downwards. Then, as shown in FIGS. 17(b) and (c), the controller 180 displays sequentially sub-items corresponding to the three messages. The display order of the sub-items can be determined according to reception time of the corresponding message.

Meanwhile, the message corresponding to the sub-item displayed in the third place is long enough to occupy a large region compared with the first and the second sub-item.

However, when the allocation region for each sub-item is fixed, the controller 180 can change the font of text displayed for the sub-item by taking into account the length of the message corresponding to the sub-item.

Figure 18:
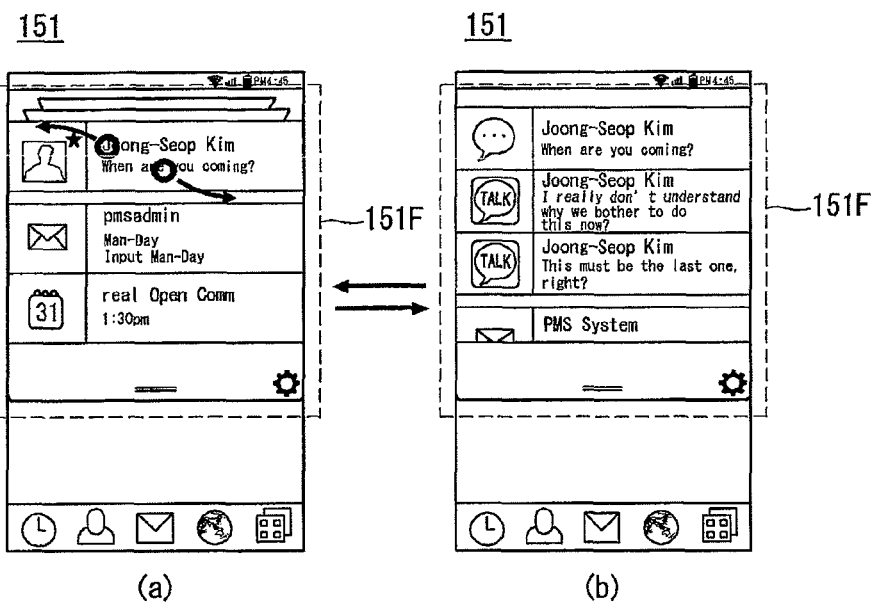
FIG. 18 shows one type of user interface provided through a notification foreground panel provided by a mobile terminal according to an embodiment of the present invention.

FIG. 18 shows one type of user interface provided through a notification foreground panel 151F provided by a mobile terminal 100 according to an embodiment of the present invention. In particular, FIG. 18(a) show when a pinch-in touch input is received with respect to a sub-item corresponding to the message received from a sender, "Joong-Seop Kim" who has been pre-registered by the user. With reference to the layer displayed in an upper part of the sub-item, it can be known that there are other messages received from the sender.

If the pinch-in touch input is received, as shown in FIG. 18(b), the controller 180 can display on the notification foreground panel 151F sub-items corresponding to the messages received from the same sender. It can be known that the messages corresponding to the sub-items can be received through applications different from each other. Meanwhile, the order according to which the sub-items are arranged can be determined by reception time of the corresponding message, type of the corresponding message receiving application, priority determined by the user, and the like.

FIG. 19 shows one type of user interface provided through a notification foreground panel 151F provided by a mobile terminal 100 according to an embodiment of the present invention. In particular, FIG. 19(a) shows when a sub-item corresponding to a message application-related event is displayed on an upper part of the notification foreground panel 151F when the user sets a message application as a favorite application. The star mark displayed on the sub-item indicates that the sub-item is related to a message application-related event which designates the user's favorite application.

FIG. 19(b) shows when sub-items corresponding to a message application-related event and a calendar application-related event are displayed on an upper part of the notification foreground panel 151F when the user sets the message application and the calendar application as the user's favorite applications. The priorities of the two applications can follow the order set by the user.

Meanwhile, the user can configure and change his or her favorite application by touching the setting icon located in a lower part of the notification foreground panel 151F.

Figure 20:
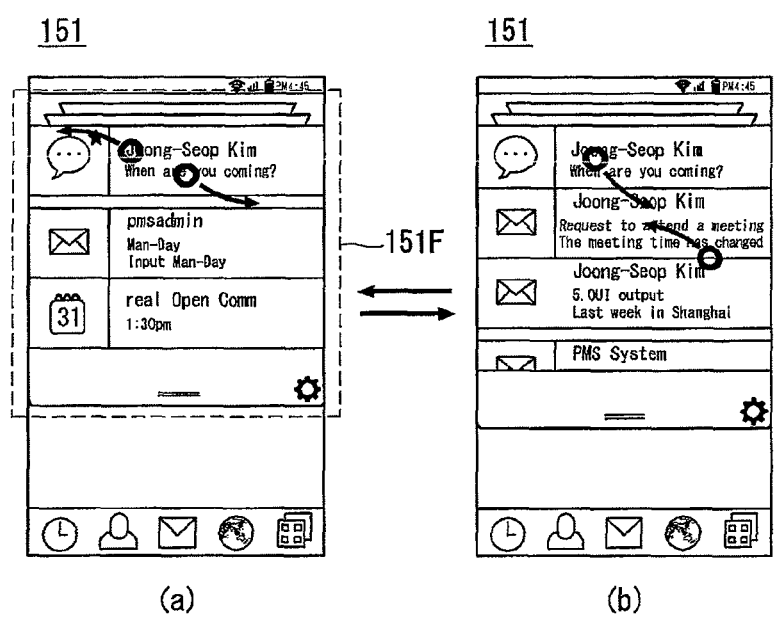
FIG. 20 shows one type of user interface provided through a notification foreground panel provided by a mobile terminal according to an embodiment of the present invention.

FIG. 20 shows one type of user interface provided through a notification foreground panel 151F provided by a mobile terminal 100 according to an embodiment of the present invention. In particular, FIG. 20(a) shows when a sub-item corresponding to an event related to "Joong-Seop Kim" is displayed on an upper part of the notification foreground panel 151F when the user sets "Joong-Seop Kim" as the user's favorite contact. The star mark displayed on the sub-item indicates that the sub-item is related to a "Joong-Seop Kim" related event designated as the user's favorite person. With reference to the layer display in an upper region of the sub-item, it can be known that multiple events are related to "Joong-Seop Kim".

As shown in FIG. 20(a), if a pinch-in touch input is received by the sub-item, the controller 180, as shown in FIG. 20(b), can display a plurality of sub-items corresponding to the events related to "Joong-Seop Kim" on the notification foreground panel 151F.

If a pinch-out touch input is received through the display region of the sub-items under the state of FIG. 20(b), the controller 180 can return the display state to that of FIG. 20(a). Meanwhile, the display order of the sub-items can be determined by an event generate order, priority among applications, and so on. However, the technical scope of the present invention is not limited to the above embodiment. Meanwhile, the user can configure and change his or her favorite application by touching the setting icon located in a lower part of the notification foreground panel 151F. Also, the user can configure and change favorite contacts by executing a contacts management application.

Figure 21:
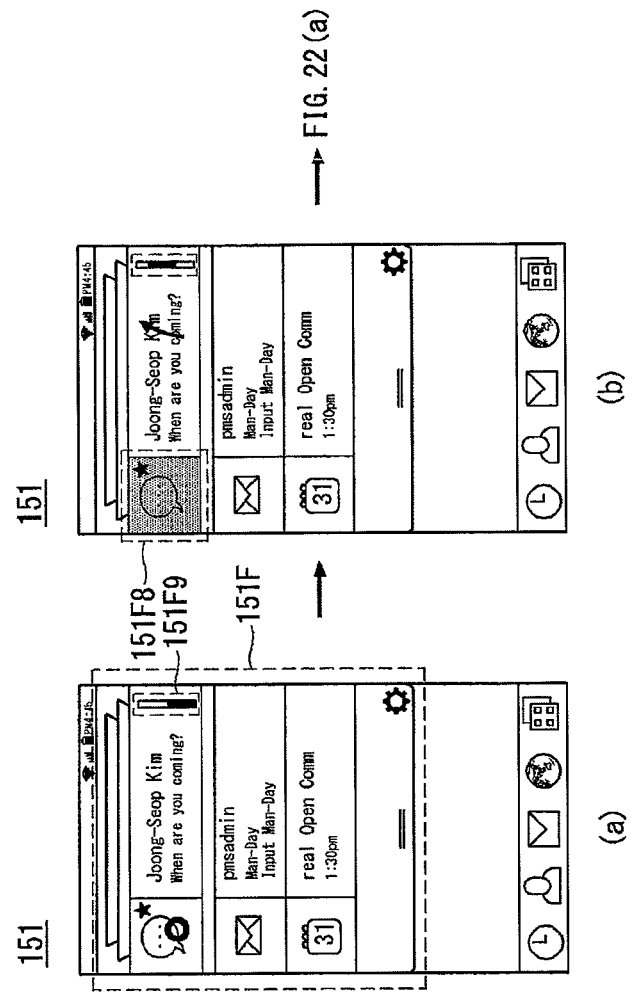
FIGS. 21 and 22 show one type of user interface provided through a notification foreground panel provided by a mobile terminal according to an embodiment of the present invention.
Figure 22:
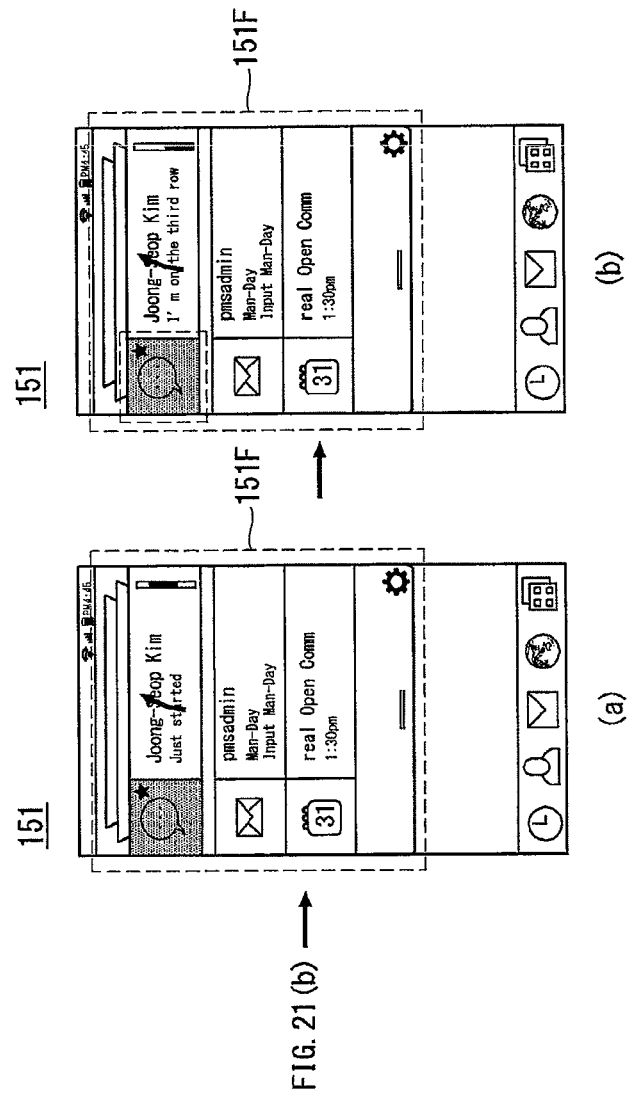

FIGS. 21 and 22 show one type of user interface provided through a notification foreground panel 151F provided by a mobile terminal 100 according to an embodiment of the present invention. In particular, FIG. 21(a) shows when a long touch is made on a sub-item corresponding to an event related to "Joong-Seop Kim" designated as the user's favorite contact.

If a long-touch input is received with respect to the sub-item, the controller 180, as shown in FIG. 21(b), displays on the sub-item an indicator 151F8 indicating that the sub-item has been selected. Under the state of FIG. 21(b), the user flicks the sub-item to the upward direction of the screen. Then, as shown in FIG. 22(a), the controller 180 displays a different sub-item corresponding to a message, the sender of which is "Joong-Seop Kim," on the region where the existing sub-item is displayed. This applies the same to FIG. 22(a) and (b). Selection of a displayed sub-item according to the flicking motion can also be implemented by using a scroll bar 151F9 included in the sub-item.

Figure 23:
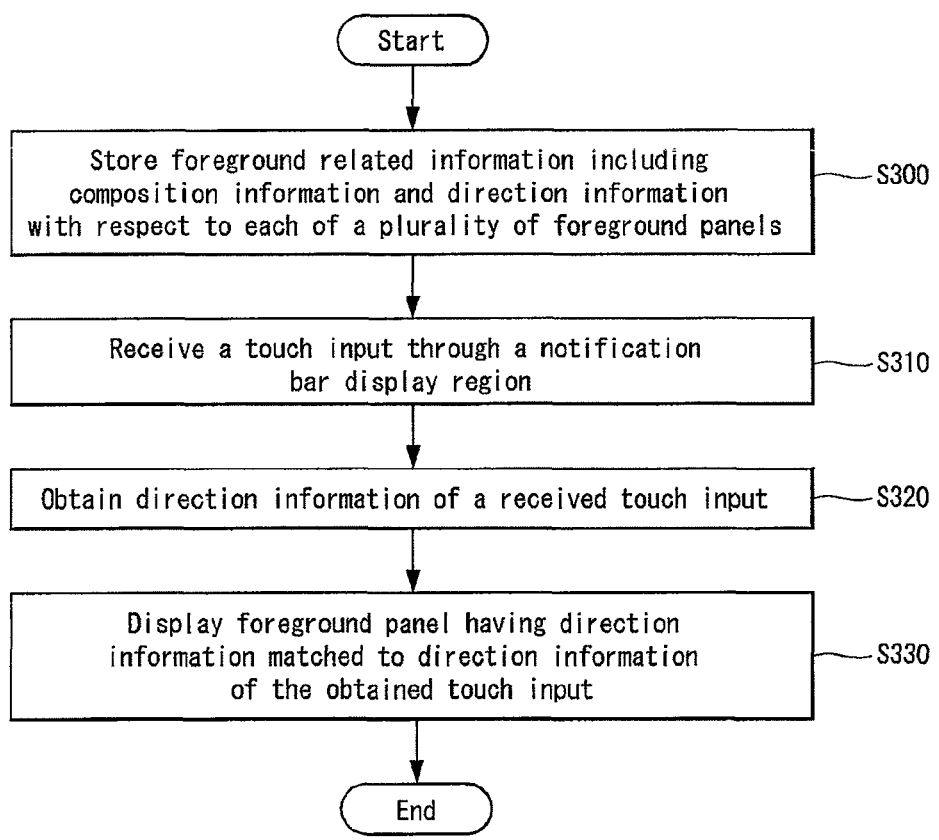
FIG. 23 is a flow diagram illustrating one example of a method for operating a mobile terminal according to an embodiment of the present invention.

FIG. 23 is a flow diagram illustrating one example of a method for operating a mobile terminal according to an embodiment of the present invention. First, the memory 160 stores, with respect to each of a plurality of foreground panels, foreground panel-related information including composition information and the corresponding direction information (S300).

Next, a touch input is received through a notification bar display region (S310). Then, the controller 180 obtains the direction information of the received touch input (S320). If the direction information of the touch input is obtained, the controller 180 obtains direction information matched to the direction information of the obtained touch input from among a plurality of direction information stored in the memory 160 and displays on the display unit 151 the foreground panel corresponding to the obtained direction information from among the plurality of foreground panels (S330).

In addition, the foreground panel displayed on the display unit 151 can be displayed being overlapped with at least part of the previously displayed screen. And the foreground panel can be opaque or translucent. Meanwhile, the touch function can still be kept to be activated in the region of the previously displayed screen except for the part where the foreground panel is displayed.

Figure 24:
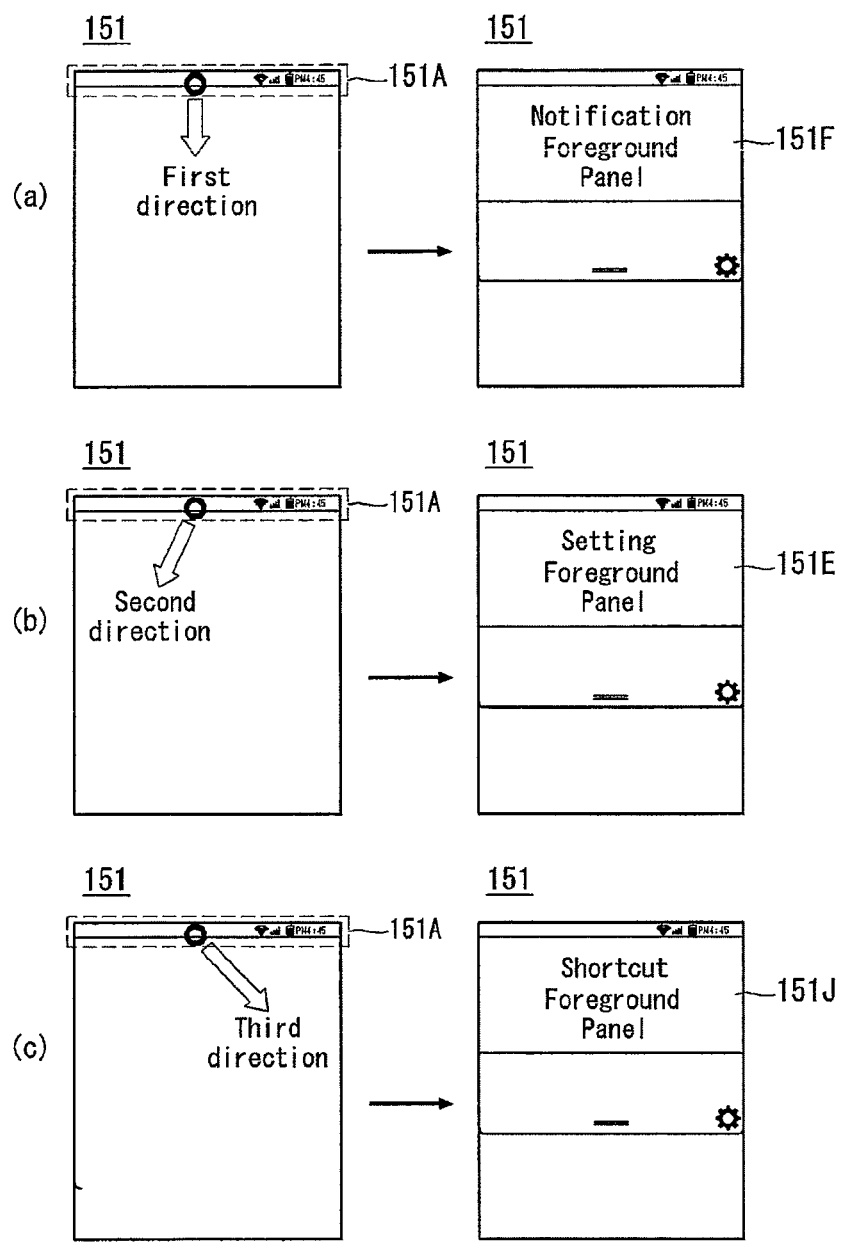
FIG. 24 shows an example where a different foreground panel can be provided based on a direction of a touch input received through a notification bar display region according to a method for operating a mobile terminal of FIG. 23.

FIG. 24 shows an example where a different foreground panel can be provided based on a direction of a touch input received through a notification bar display region according to a method for operating a mobile terminal of FIG. 23. In particular, with reference to FIG. 24(a), the mobile terminal 100 displays the notification foreground panel 151F on the display unit 151 if a received touch input points downwards.

With reference to FIG. 24(b), the mobile terminal 100 displays the foreground panel 151E for environment setting on the display unit 151 if a received touch input points to the left downwards. With reference to FIG. 24(c), the mobile terminal 100 displays the foreground panel 151J for shortcuts on the display unit 151 if a received touch input points to the right downwards.

Figure 25:
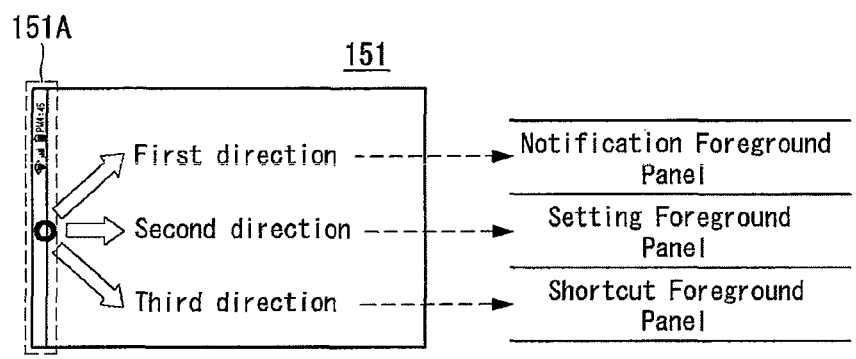
FIG. 25 shows another example where a different foreground panel can be provided based on a direction of a touch input received through a notification bar display region according to a method for operating a mobile terminal of FIG. 23.

FIG. 25 shows another example where a different foreground panel can be provided based on a direction of a touch input received through a notification bar display region according to a method for operating a mobile terminal of FIG. 23. With reference to FIG. 25, display of the foreground panel can be changed according to the direction of a touch input received through the notification bar displayed in the left-side peripheral region of the screen of the display unit 151.

More specifically, if the direction of a received touch input points to the right, the notification foreground panel 151F is displayed on the display unit 151; if the direction of a received touch input points to the right upwards, the foreground panel 151E for environment setting is displayed on the display unit 151; and if the direction of a received touch input points to the right downwards, the foreground panel 151J for shortcuts can be displayed on the display unit 151.

Figure 26:
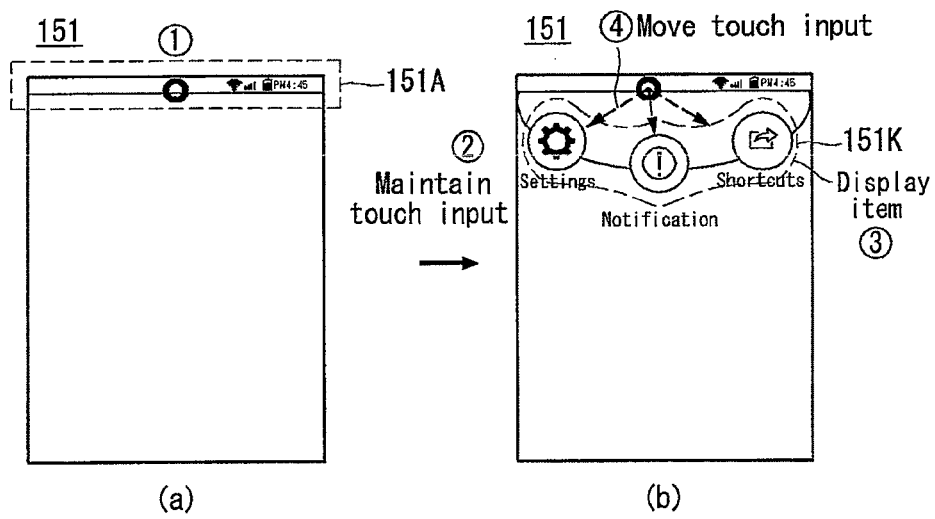
FIG. 26 shows an example of a guiding item for the user to select a foreground panel in a mobile terminal according to an embodiment of the present invention capable of selecting a foreground panel based on a direction of a touch input.

FIG. 26 shows an example of a guiding item for the user to select a foreground panel in a mobile terminal 100 according to an embodiment of the present invention capable of selecting a foreground panel based on a direction of a touch input. In particular, FIG. 26(a) shows when the user touches the notification bar display region 151A. If a received touch input last for more than a predetermined period of time, the controller 180, as shown in FIG. 26(b), displays items 151K corresponding to a plurality of foreground panels along a plurality of predetermined directions.

Then, seeing the plurality of items 151K, the user moves a touch towards the item corresponding to the foreground panel that the user wants, thereby selecting the foreground panel that the user wants. Meanwhile, these items can be displayed only for a predetermined period of time.

Figure 27:
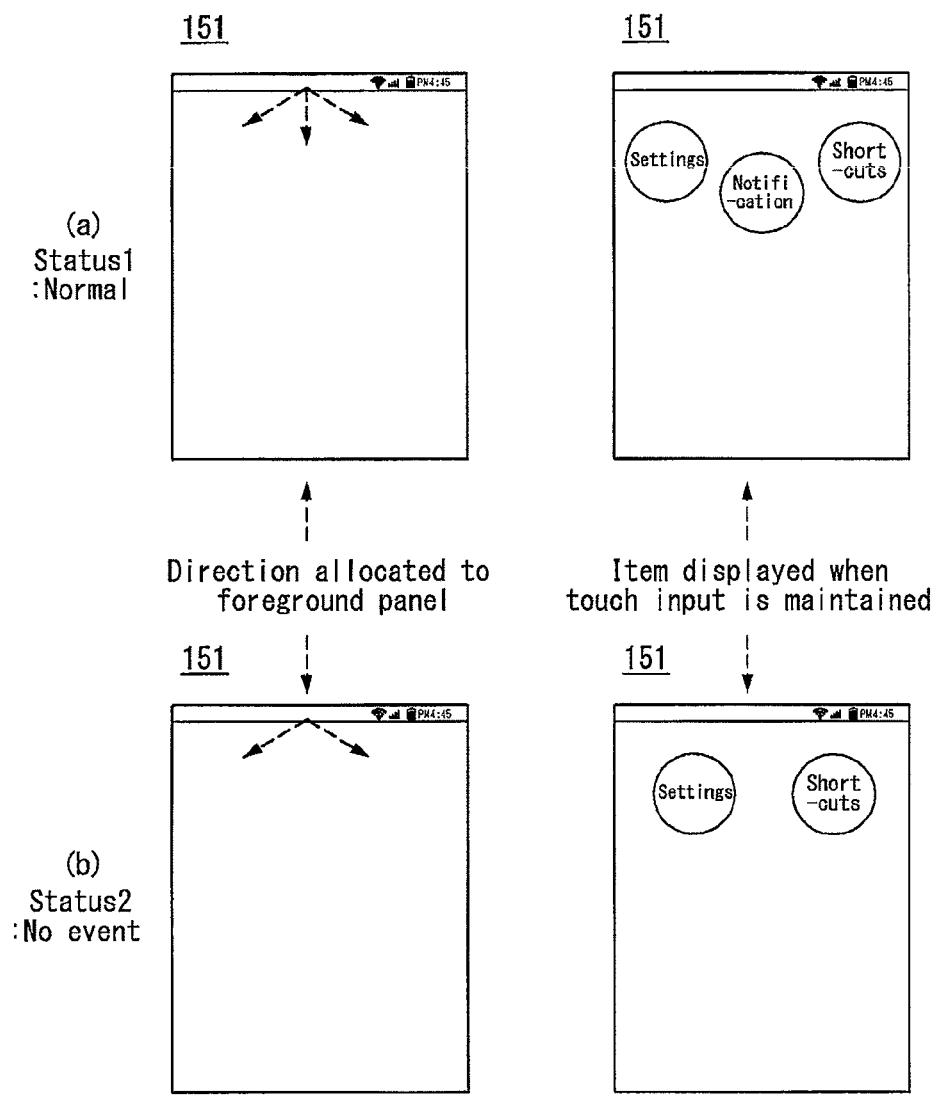
FIG. 27 shows an example where in a mobile terminal according to an embodiment of the present invention capable of selecting a foreground panel based on a direction of a touch input, a direction that the user can choose and an item according to the chosen direction are changed according to an operation state of the mobile terminal.

FIG. 27 shows an example where in a mobile terminal 100 according to an embodiment of the present invention capable of selecting a foreground panel based on a direction of a touch input, a direction that the user can choose and an item according to the chosen direction are changed according to an operation state of the mobile terminal 100.

With reference to FIG. 27(*a*), the mobile terminal 100 in a normal state allocates three directions for foreground panel selection, where a foreground panel is allocated to each of the three directions. With reference to FIG. 27(*b*), if no event occurs with respect to the notification foreground panel and two directions are allocated for foreground panel selection, the mobile terminal 100 allocates a foreground panel to each of the two directions.

As described above, reflecting an operation state of the mobile terminal 100, the mobile terminal 100 according to an embodiment of the present invention can change the type of foreground panel that can be chosen based on a direction of a touch input received through the notification bar. And the mobile terminal 100, reflecting the operation state of the mobile terminal 100, can change the foreground panel corresponding to a particular direction.

Further, reflecting an operation state of the mobile terminal 100, the mobile terminal 100 can change composition information of a particular foreground panel. In other words, reflecting the operation state of the mobile terminal 100, the mobile terminal 100 can change foreground panel-related information of the particular foreground panel. Also, the mobile terminal 100 can change the aforementioned information (or data) by taking into account the usage pattern of the user corresponding to the operation state of the mobile terminal 100.

Figure 28:
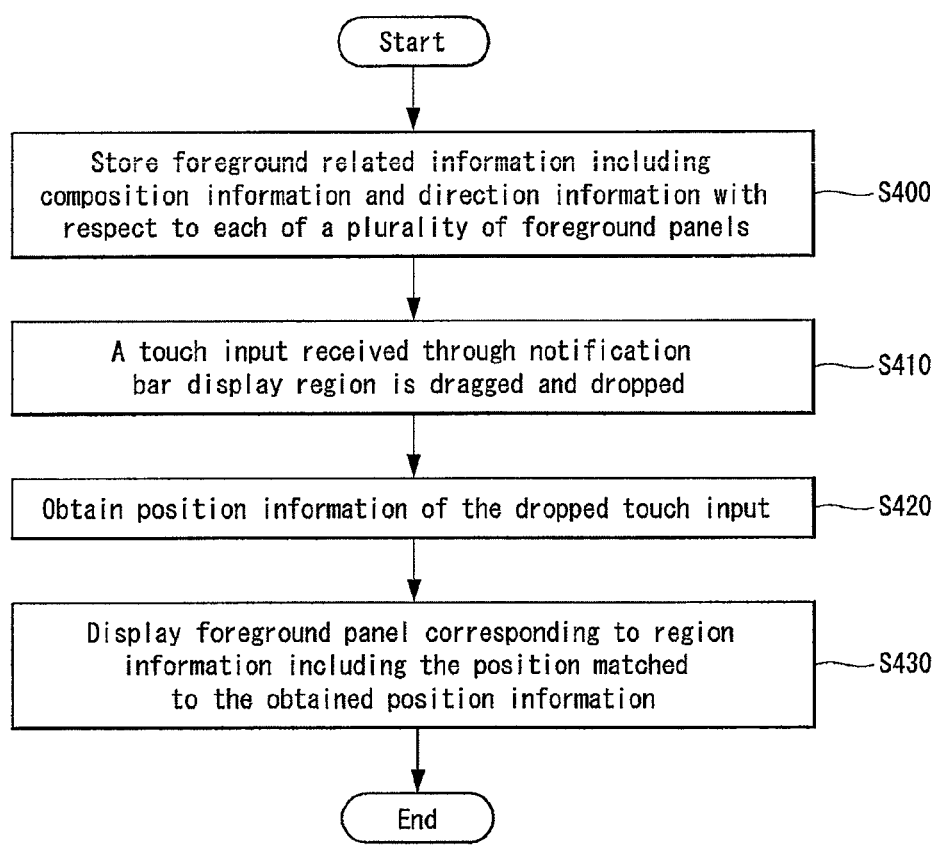
FIG. 28 shows one example of a method for operating a mobile terminal according to an embodiment of the present invention.

FIG. 28 shows one example of a method for operating a mobile terminal according to an embodiment of the present invention. First, the memory 160 stores with respect to each of a plurality of foreground panels, foreground panel-related information including composition information and the corresponding region information (S400).

Next, a touch input is received through the notification bar display region and the received touch input is dragged and dropped to a particular position (S410). Then the controller 180 obtains the drop position of the touch input (S420). Obtaining the drop position of the touch input, the controller 180 obtains region information including the obtained position from among a plurality of region information stored in the memory 160 and displays on the display unit 151 the foreground panel corresponding to the obtained region information from among the plurality of foreground panels (S430).

In addition, the foreground panel displayed on the display unit 151 can be displayed being overlapped with at least part of the previously displayed screen. And the foreground panel can be opaque or translucent. Meanwhile, the touch function can still be kept activated in the region of the previously displayed screen except for the part where the foreground panel is displayed.

Figure 29:
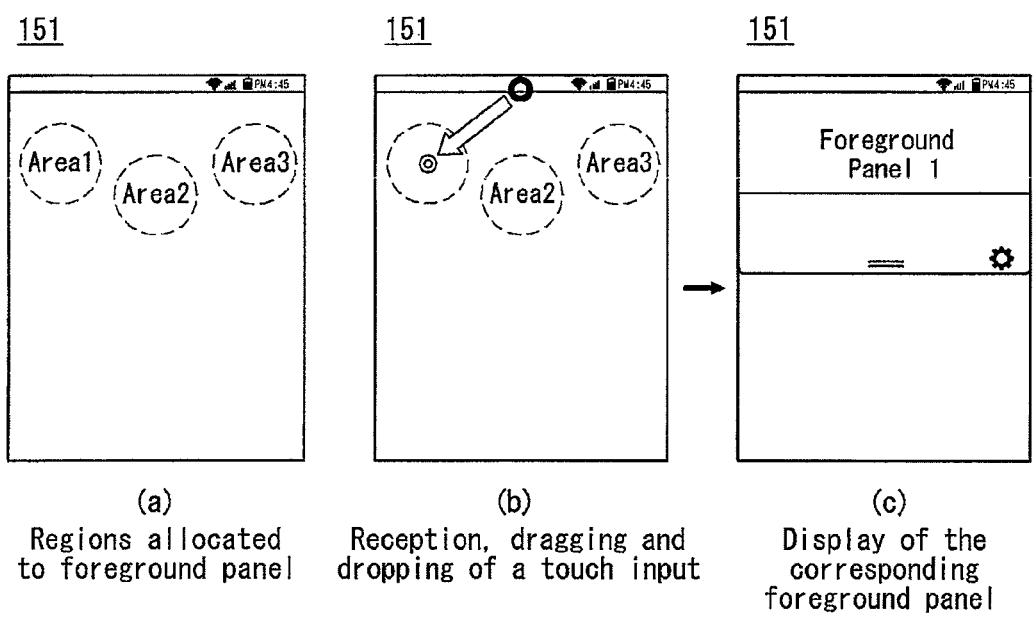
FIG. 29 shows an example of displaying a particular foreground panel according to a method for operating a mobile terminal of FIG. 28.

FIG. 29 shows an example of displaying a particular foreground panel according to a method for operating a mobile terminal of FIG. 28. In particular, FIG. 29(*a*) shows when three regions are allocated for foreground selection. FIG. 29(*b*) shows when the user touches the notification bar display region 151A and drags the touch to drop it at a particular region (Area 1). Then the controller 180, as shown in FIG. 29(*c*), can display the foreground panel corresponding to the particular region (Area 1) on the display unit 151.

Meanwhile, the mobile terminal 100, if the received touch is maintained for more than a predetermined period of time, can display the items representing the foreground panel corresponding to the regions. And the items can be displayed temporarily for a predetermined period of time or until the touch is dropped.

FIG. 30 shows an example of a mobile terminal 100 according to an embodiment of the present invention capable of selecting a foreground panel based on a drop position of a touch input, a direction that the user can choose is changed according to an operation state of the mobile terminal 100. With reference to FIG. 30(*a*), the mobile terminal 100 in a normal state divides the region adjacent to the notification bar display region 151A into three regions and allocates a foreground region corresponding to each of the three regions.

With reference to FIG. 30(*b*), if no event occurs with respect to the notification foreground panel, the mobile terminal 100 divides the region adjacent to the notification bar display region 151A into two sub-regions and allocates a foreground panel to each of the two regions.

As described above, reflecting an operation state of the mobile terminal 100, the mobile terminal 100 according to an embodiment of the present invention can change the type of foreground panel that can be chosen based on the drop of a touch input received through the notification bar. And the mobile terminal 100, reflecting the operation state of the mobile terminal 100, can change the region itself allocated to foreground panel selection.

In addition, reflecting an operation state of the mobile terminal 100, the mobile terminal 100 can change the foreground panel corresponding to a particular region. Also, the mobile terminal 100, reflecting the operation state of the mobile terminal 100, can change the composition information of the particular foreground panel.

In other words, reflecting the operation state of the mobile terminal 100, the mobile terminal 100 can change foreground panel-related information of the particular foreground panel. Also, the mobile terminal 100 can change the aforementioned information (or data) by taking into account the usage pattern of the user corresponding to the operation state of the mobile terminal 100.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A mobile terminal, comprising:
   a wireless communication unit configured to provide wireless communication;
   a memory configured to store a setting foreground panel, a notification foreground panel, a shortcut foreground panel and a plurality of functions for setting an environment of the mobile terminal;
   a touch screen; and
   a controller configured to:
   display, via the touch screen, an execution screen of a specific application,
   simultaneously display, via the touch screen, a setting item indicating the setting foreground panel, a notification item indicating the notification foreground panel and a shortcut item indicating the shortcut foreground panel in response to a touch input received on a notification bar display region of the touch screen,
   display, via the touch screen, the setting foreground panel including at least one setting sub-item when the touch input is dragged and dropped to the setting item, wherein the at least one setting sub-item indicates each of functions usable in the specific application selected from the plurality of functions,
   display, via the touch screen, the notification foreground panel including at least one notification sub-item when the touch input is dragged and dropped to the notification item, wherein the at least one notification sub-item indicates each of messages received at the mobile terminal, and
   display, via the touch screen, the shortcut foreground panel including at least one shortcut sub-item when the touch input is dragged and dropped to the shortcut item, wherein the at least one shortcut sub-item indicates each of applications preset as a shortcut,
   wherein one of the setting foreground panel, the notification foreground panel and the shortcut foreground panel is displayed by overlapping one foreground panel on the execution screen.

2. The mobile terminal of claim 1, wherein the controller is further configured to slidably expand the foreground panel to overlap on the execution screen.

3. The mobile terminal of claim 1, wherein the controller is further configured to:
   display at least one of the setting item, the notification item and the shortcut item based on an operation state of the mobile terminal.

4. The mobile terminal of claim 3, wherein the operation state of the mobile terminal includes at least one of an event occurred on the mobile terminal, a usage pattern of a user using the mobile terminal, a usage pattern of the user with respect to an application currently under execution, and a usage pattern of the user in an execution state of the application currently under execution.

5. The mobile terminal of claim 3,
   wherein the controller is further configured to:
   if a touch input of a first style is received on a sub-item in the notification foreground panel notifying an occurrence of an event related to a particular application, display an execution screen of a particular application taking into account the occurred event on the touch screen, and
   if a touch input of a second style is received on the sub-item in the notification foreground panel, display a user interface dedicated to performing a particular function of the particular application predetermined in accordance with the occurred event by overlapping the user interface on at least part of the touch screen.

6. The mobile terminal of claim 5, wherein the sub-item in the notification foreground panel corresponds to a message reception event, the execution screen is for a messaging application, and the user interface is dedicated to performing a response message corresponding to the message reception event by overlapping the user interface.

* * * * *